US012431752B2

(12) United States Patent
Furuhaug

(10) Patent No.: US 12,431,752 B2
(45) Date of Patent: Sep. 30, 2025

(54) CONTINUOUS WAVE-WINDING FOR STATOR

(71) Applicant: Rolls-Royce Electrical Norway AS, Trondheim (NO)

(72) Inventor: Roar Furuhaug, Trondheim (NO)

(73) Assignee: Rolls-Royce Electrical Norway AS, Trondheim (NO)

( * ) Notice: Subject to any disclaimer, the term of this patent is extended or adjusted under 35 U.S.C. 154(b) by 116 days.

(21) Appl. No.: 17/448,000

(22) Filed: Sep. 17, 2021

(65) Prior Publication Data

US 2023/0089931 A1   Mar. 23, 2023

(51) Int. Cl.
| | |
|---|---|
| *H02K 3/12* | (2006.01) |
| *H02K 1/16* | (2006.01) |
| *H02K 3/28* | (2006.01) |
| *H02K 3/50* | (2006.01) |
| *H02K 5/22* | (2006.01) |
| *H02K 15/085* | (2006.01) |

(52) U.S. Cl.
CPC ............... *H02K 3/12* (2013.01); *H02K 1/165* (2013.01); *H02K 3/28* (2013.01); *H02K 3/50* (2013.01); *H02K 5/225* (2013.01); *H02K 15/085* (2013.01)

(58) Field of Classification Search
CPC ....................................................... H02K 3/14
USPC ........................................................ 310/207
See application file for complete search history.

(56) References Cited

U.S. PATENT DOCUMENTS

| | | | |
|---|---|---|---|
| 6,140,735 A * | 10/2000 | Kato | ........................ H02K 3/28 |
| | | | 310/201 |
| 6,960,857 B2 * | 11/2005 | Oohashi | ............... H02K 15/067 |
| | | | 310/201 |
| 7,034,428 B2 | 4/2006 | Cai et al. | |
| 7,091,644 B2 | 8/2006 | Fukushima et al. | |
| 7,281,312 B2 | 10/2007 | Sadiku et al. | |
| 8,253,296 B2 * | 8/2012 | Kouda | ..................... H02K 3/12 |
| | | | 310/201 |
| 8,829,754 B2 | 9/2014 | Miyata et al. | |
| 8,829,756 B2 | 9/2014 | Suzuki et al. | |
| 8,916,999 B2 | 12/2014 | Imai et al. | |
| 8,987,970 B2 | 3/2015 | Uchida et al. | |
| 9,847,686 B2 | 12/2017 | Tamura | |

(Continued)

FOREIGN PATENT DOCUMENTS

| | | |
|---|---|---|
| EP | 1109289 A2 | 6/2001 |
| KR | 20140064230 A | 5/2014 |

*Primary Examiner* — Tulsidas C Patel
*Assistant Examiner* — Minki Chang
(74) *Attorney, Agent, or Firm* — Shumaker & Sieffert, P.A.

(57) ABSTRACT

A stator apparatus includes a stator core and a wave-winding coil. The wave-winding coil includes a flexible conductor defining a first conductor portion and a second conductor portion between a first end and a second end. The first conductor portion is mechanically supported by a first stator slot cluster, a second stator slot cluster, and third stator slot cluster of a stator core such that a primary overhang extends from the first stator slot to the second stator slot and a secondary overhang extends from the second stator slot to the third stator slot. The second conductor portion is mechanically supported by the first stator slot cluster, second stator slot cluster, and third stator slot cluster such that primary and secondary overhangs of the second conductor portion extend over an opposite axial side of the stator core from the first conductor portion.

14 Claims, 14 Drawing Sheets

(56) References Cited

U.S. PATENT DOCUMENTS

| | | | |
|---|---|---|---|
| 10,056,794 B2 | 8/2018 | Saito et al. | |
| 10,320,246 B2 | 6/2019 | Calley | |
| 10,340,756 B2 | 7/2019 | Saito et al. | |
| 10,615,654 B2 | 4/2020 | Sadiku et al. | |
| 11,509,200 B2 * | 11/2022 | Ranalli | H02K 15/04 |
| 2004/0187293 A1 | 9/2004 | Bradford | |
| 2005/0046288 A1 | 3/2005 | Kawabata et al. | |
| 2009/0134737 A1 | 5/2009 | Maekawa et al. | |
| 2011/0095639 A1 * | 4/2011 | Nakamura | H02K 15/0414 |
| | | | 29/592.1 |
| 2012/0181886 A1 * | 7/2012 | Osada | H02K 11/05 |
| | | | 310/71 |

* cited by examiner

CONTINUOUS WAVE-WINDING FOR STATOR

TECHNICAL FIELD

The disclosure relates to the stator of an electrical rotating machine. More specifically, this disclosure relates to a component part and winding technique for the stator of an electrical rotating machine.

BACKGROUND

Electrical rotating machines may generate rotary motion from a supplied electrical power and/or generate electrical power using a supplied rotary motion. The rotating machine may include a stator and a rotor configured to rotate relative to the stator. The stator may be configured to receive electrical power and generate a rotating magnetic field when the rotating machine acts as a motor. The stator may be configured to interact with a rotating magnetic field to generate a voltage and/or current when the rotating machine acts as a generator. In examples, the stator mechanically supports one or more coil windings configured to produce the rotating magnetic field or generate the electrical power.

SUMMARY

In general, the disclosure describes a stator apparatus configured to surround an axis of a rotating machine. The stator apparatus may include wave-winding coils wound around an inner stator periphery surrounding the axis, with each wave-winding coil corresponding to a pole of the rotating machine. A flexible, substantially contiguous conductor defines each wave-winding coil and is mechanically supported by stator slots defined by the stator apparatus. The flexible, substantially contiguous conductor may be one of a plurality of conductors in a Litz-wire defining the wave-winding coil. In examples, the conductor and/or plurality of conductors defining each wave-winding coil is electrically insulated from its surroundings between a first end and a second end. The contiguous conductor may be wound around the stator periphery between the first end and the second end as a substantially uniform conductor bending to define a plurality of primary overhangs and a plurality of secondary overhangs.

In an example, a stator apparatus includes a stator core defining an axis and includes a front side and a back side axially displaced from the front side. The stator core defines at least a first stator slot cluster, a second stator slot cluster, and a third stator slot cluster around a periphery of the stator core surrounding the axis, wherein the first stator slot cluster, the second stator slot cluster, and the third stator slot cluster each comprise one or more adjacent individual stator slots which extend from the front side to the back side, and wherein the second stator slot cluster is between the first stator slot cluster and the third stator slot cluster along the periphery. The stator apparatus includes a wave-winding coil comprising a flexible conductor extending from a first end to a second end and defining a first conductor portion and a second conductor portion between the first end and the second end, wherein the first conductor portion is mechanically supported by the first stator slot cluster, the second stator slot cluster, and the third stator slot cluster to define a first primary overhang extending from the first stator slot cluster to the second stator slot cluster and a first secondary overhang extending from the second stator slot cluster to the third stator slot cluster. The first primary overhang extends over the front side and the secondary overhang extends over the back side. The second conductor portion is mechanically supported by the first stator slot cluster, the second stator slot cluster, and the third stator slot cluster to define a second primary overhang extending from the first stator slot cluster to the second stator slot cluster and a second secondary overhang extending from the second stator slot cluster to the third stator slot cluster. The second primary overhang extends over the back side and the second secondary overhang extends over the front side.

In an example, an electrical rotating machine includes a stator core defining an axis and includes a front side and a back side axially displaced from the front side. The stator core defines at least a first stator slot cluster, a second stator slot cluster, and a third stator slot cluster around a periphery of the stator core surrounding the axis. The first stator slot cluster, the second stator slot cluster, and the third stator slot cluster comprise one or more adjacent individual stator slots which extend from the front side to the back side, and the second stator slot cluster is between the first stator slot cluster and the third stator slot cluster along the periphery. The electrical rotating machine includes wave-winding coil including a flexible conductor extending from a first end to a second end and defining a first conductor portion and a second conductor portion between the first end and the second end, wherein the first conductor portion is mechanically supported by the first stator slot cluster, the second stator slot cluster, and the third stator slot cluster to define a first primary overhang extending from the first stator slot cluster to the second stator slot cluster and a first secondary overhang extending from the second stator slot cluster to the third stator slot cluster. The first primary overhang extends over the front side and the secondary overhang extends over the back side. The second conductor portion is mechanically supported by the first stator slot cluster, the second stator slot cluster, and the third stator cluster slot to define a second primary overhang extending from the first stator slot cluster to the second stator slot cluster and a second secondary overhang extending from the second stator slot cluster to the third stator slot cluster. The second primary overhang extends over the back side and the second secondary overhang extends over the front side. The second conductor portion is overlaid on the first conductor portion in the first stator slot cluster and the third stator slot cluster and the first conductor portion is overlaid on the second conductor portion in the second stator slot cluster when the first conductor portion and the second conductor portion are positioned in the first stator slot cluster, the second stator slot cluster, and the third stator slot cluster. The wave-winding coil includes a first electrical connector at the first end, a second electrical connector at the second end, and an insulative covering extending substantially from the first electrical connector to the second electrical connector, wherein the insulative covering is configured to electrically isolate the wave-winding coil between the first electrical connector and the second electrical connector.

In an example, a method includes mechanically supporting a first conductor portion of a wave-winding coil with a first stator slot cluster, a second stator slot cluster, and a third stator slot cluster defined by a stator core around a periphery of the stator core. The first conductor portion defines a first primary overhang extending over a front side of the stator core from the first stator slot cluster to the second stator slot cluster and a first secondary overhang extending over a back side of the stator core from the second stator slot cluster to the third stator slot cluster. The front side is axially displaced from the back side. The first stator slot cluster, the second stator slot cluster, and the third stator slot cluster comprise one or more adjacent individual stator slots which extend from the front side to the back side, and the second stator slot cluster is between the first stator slot cluster and the third stator slot cluster along the inner stator periphery. The method includes mechanically supporting a second conductor portion defined by the wave-winding coil through the first stator slot cluster, the second stator slot cluster, and the third stator slot cluster, wherein the second conductor portion defines a second primary overhang extending over the back side from the first stator slot cluster to the second stator slot cluster and a second secondary overhang extending over the front side from the second stator slot cluster to the third stator slot cluster. The wave-winding coil comprises a flexible conductor extending from a first end to a second end and defining the first conductor portion and the second conductor portion between the first end and the second end.

The details of one or more examples are set forth in the accompanying drawings and the description below. Other features, objects, and advantages will be apparent from the description and drawings, and from the claims.

DETAILED DESCRIPTION

Figure 1:
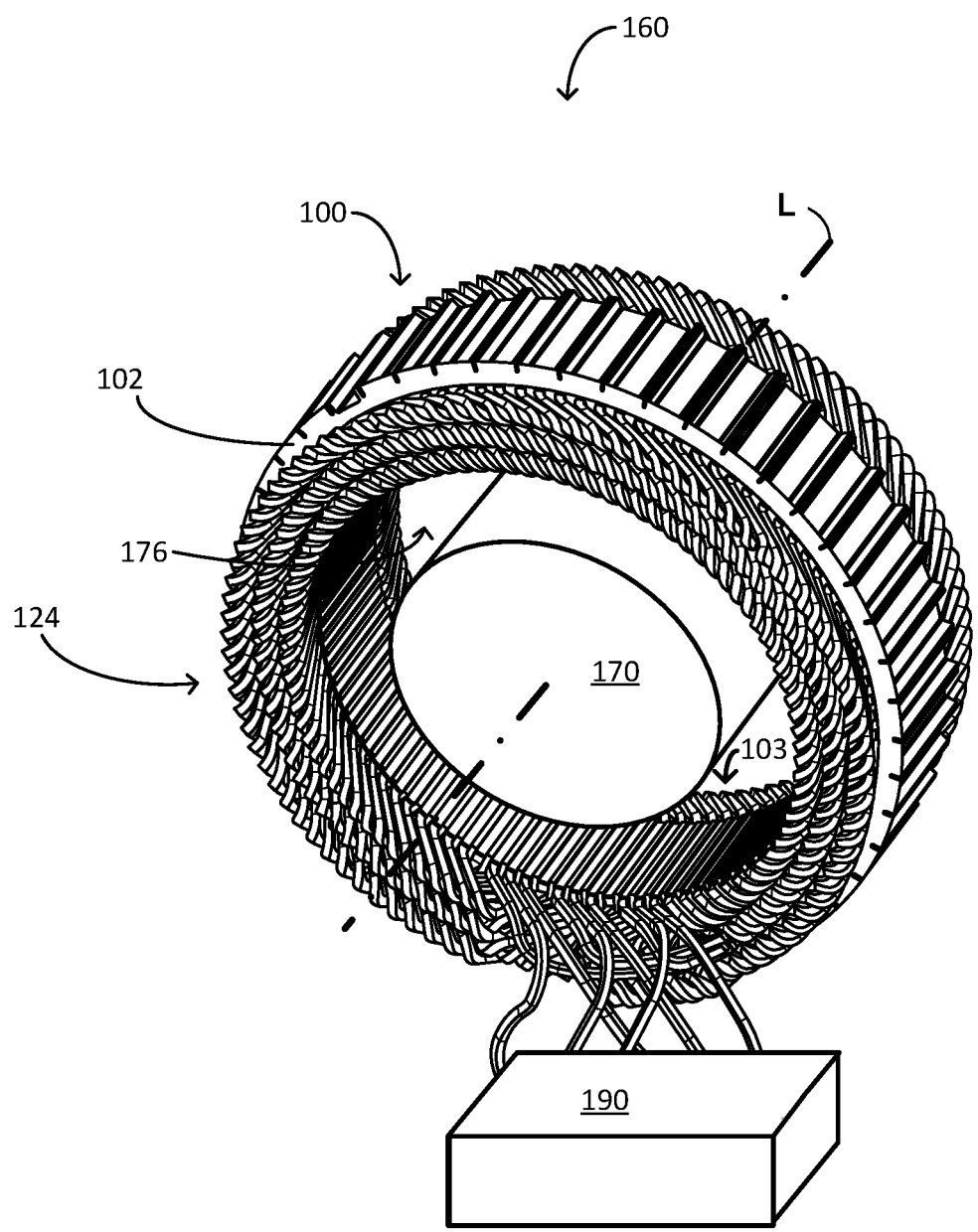
FIG. 1 is a perspective view illustrating an example rotating machine.

The disclosure describes a stator apparatus configured for use in a rotating machine. Rotating machines may be used to generate rotary motion from a supplied electrical power and/or generate electrical power using a supplied rotary motion. For example, an electric motor may convert electrical energy into rotational mechanical energy. Typically, the rotating machine includes a stator and a rotor configured to rotate relative to the stator. When the rotating machine acts as a motor, the stator may receive electrical power and generate a rotating magnetic field to induce rotation of the rotor to generate the rotary motion. When the rotating machine acts as a generator, a rotation of the rotor may provide a rotating magnetic field inducing a voltage and/or current in the stator to generate the electrical power.

The stator apparatus includes one or more wave-winding coils wound around a stator periphery surrounding the axis, with each wave-winding coil corresponding to a pole of the rotating machine. In some examples, the stator periphery is an inner periphery of a stator core, where the stator core surrounds a rotor. In some examples, the stator periphery is a outer stator periphery, where the rotor is external and the stator is internal (e.g., the rotor rotates around the stator). A flexible, substantially contiguous conductor mechanically supported by stator slots defines each wave-winding coil. In examples, the flexible, substantially contiguous conductor may be one of a plurality of conductors in a Litz-wire defining the wave-winding coil. In examples, the conductor and/or plurality of conductors defining each wave-winding coil is electrically insulated between a first end and a second end. An electrically insulated coil may be conductive from the first end to the second end via the conductor, but electrically insulated from its surroundings by an insulative layer surrounding the conductor. The contiguous conductor may be wound through stator slot clusters of the stator apparatus between the first end and the second end, such that the flexible, substantially contiguous conductor defines a substantially uniform conductor that bends to define a plurality of primary overhangs and a plurality of secondary overhangs. In some examples, such as when the stator apparatus is wound in a conventional distributed winding pattern, stator slot clusters may be individual stator slots. In some examples, such as when the stator is wound in a fractional winding, stator slot clusters may comprise an individual stator slot and an additional stator slot located near the individual stator slot.

The plurality of primary overhangs and secondary overhangs may be interleaved with overhangs defined by additional wave-winding coils of the stator apparatus, with each additional wave-winding coil defined by a flexible, substantially contiguous conductor defining a corresponding first end and second end. The use of flexible, substantially contiguous conductors configured to bend to define interleaved primary and second overhangs allows the arrangement of multi-pole windings in a compact geometry without the use of hairpin winding or other arrangements requiring intervening hardware components, enabling increased power efficiencies by reducing end-winding heat losses and providing for reduced overall machine dimensions.

The stator may include one or more coil windings configured to produce the rotating magnetic field or generate the electrical power. A coil winding may be mechanically supported by the stator core such that the coil winding and the rotor (e.g. A rotor winding) may magnetically interact across an air gap as the rotor rotates relative to the stator. In examples, the stator defines a stator volume and an axis passing through the stator volume. The stator may be substantially shaped like a hollow cylinder. The rotor may be configured to rotate around the axis while separated from the stator by the air gap. The rotor may be configured to rotate around the axis when the rotor rotates relative to the stator within the stator volume.

In examples, the stator is configured to receive electrical power and generate a rotating magnetic field to induce rotation of the rotor to generate rotary motion. The stator may generate a rotating magnetic field when an alternating current, or sinusoidal, waveform is passed through the one or more stator coil windings. Stator coil windings may be arranged about the stator core such that multiple magnetic poles generate the rotary motion when the alternating current is supplied in multiple phases. A symmetric rotating magnetic field may be produced when the stator coil windings are disposed at an electrical angle that is compatible with the polyphase current. For instance, a symmetrical six-pole rotating magnetic field may be generated by stator coil windings disposed at a 60-degree electrical angle from each other. The rotation of the magnetic field causes a motor action in the rotor. Each stator winding coil may be controlled by a motor controller to control the motor action.

In examples, the rotor provides the rotating magnetic field, and the stator is configured to generate electrical power induced by the rotating magnetic field of the rotor. Relative motion between the rotor field and the stator winding coils may induce a voltage and/or current in the one or more stator wave-winding coils. Each of the stator wave-winding coils may be connected to a controller to provide the electrical power to a power distribution network.

The disclosure describes an example stator apparatus and example techniques for winding a stator for a rotating machine. Wave-winding, or series winding, is an armature winding arrangement in which the end of one coil is connected to the start of another coil of the same polarity in series. The coils are typically constructed in two layers and follow each other on the surface of the armature in the form of a series of wave shapes. The disclosure describes examples attractive to high power density electrical machines because the stator apparatus is compact, with lower end-winding weight than other winding layouts. The described examples use a single continuous flexible conductor for each stator winding coil. This may provide an advantage over wave-winding with the hair-pin winding technique because the single, unitary stator winding coil may reduce or eliminate the need for welded connections, which are susceptible to failure.

The present disclosure illustrates an example stator apparatus and winding technique, applicable to any n-phase machine design. In examples, the number of phases n is three or greater. The disclosed winding technique enables a short-end winding layout. The short-end winding layout may substantially minimize a length of the conductive material that extends beyond the stator core in the axial direction. Extra conductive material extending beyond the stator core in the axial direction may increase losses due to increased resistance along the wire length. Thus, the short-end winding layout may allow for increased power efficiency and reduced end-winding heat losses. The present disclosure illustrates an example stator apparatus and winding technique which may not require cable splicing or welding, allowing for increased reliability and improved manufacturing yields. The present disclosure illustrates an example stator apparatus and winding technique that allows for a more compact and relatively lightweight stator apparatus.

The stator apparatus disclosed may be a portion and/or component of a rotating machine configured to act as either a motor or a generator. In examples, the stator apparatus is configured to generate a N-phase electrical power (e.g., when the rotating machine is a generator). In examples, the stator apparatus is configured to produce a rotating N-pole magnetic field (e.g., when the rotating machine is a motor). As used herein, when the disclosure refers to an N-phase stator apparatus, this may mean a stator apparatus configured to generate a N-phase electrical power in some examples, and may mean a stator apparatus configured to produce a rotating M-pole magnetic field in other examples. An N-phase rotating machine may mean rotating machine configured to act as a motor, a generator, or a motor-generator.

The stator apparatus may include a stator core defining an axis and including a front side and a back side axially displaced from the front side. The stator core may define a plurality of stator slots around a periphery defined by the stator core and surrounding the axis. The periphery may be an inner stator periphery when the stator core is configured to rotate around the rotor. The periphery may be an outer stator periphery when the stator is internal and the rotor is external (e.g., the rotor substantially surrounds the stator), such that the plurality of stator slots is arranged on the outer periphery of the stator core. The plurality of stator slots may extend from the front side to the back side. The plurality of stator slots may define one or more stator slot clusters. In examples, an individual stator slot may define a stator slot cluster. In other examples, two adjacent individual stator slots define a stator slot cluster. In still other examples, a stator slot cluster may be defined by a first individual stator slot and second individual stator slot, where the second individual stator slot and the first individual stator slot are separated from each other by a number of intervening individual stator slots. In other words, a stator slot cluster may be defined as comprising the individual stator slots that support a single electrical phase within a single pole sector. Stator slot clusters defined by more than one individual stator slot represent a fractional winding arrangement. A fractional winding arrangement may be employed, in some cases, to improve the resulting waveform and reduce distorting harmonics.

The plurality of stator slots may define one or more slot groups. In examples, the stator apparatus is configured to define a plurality of phases for an N-phase rotating machine, and the plurality of stator slots define a slot group corresponding to each phase. The stator apparatus may include a plurality of wave-winding coils, with an individual wave-winding coil mechanically supported by stator slot clusters within and defining an individual slot group. In examples, the individual wave-winding coil is wound through and mechanically supported by the individual slot group such that the individual wave-winding coil forms one or more double-layer winding arrangements in each stator slot cluster defining the individual slot group (e.g., a double layer arrangement for each circumference of the inner periphery of the stator core).

A wave-winding coil may include a flexible conductor defining a first end and a second end opposite the first end. In examples, the conductor is electrically insulated from its surroundings by an insulative layer surrounding the conductor substantially from the first end to the second end. Each wave-winding coil may be mechanically supported by the stator core within a plurality of stator slot clusters around some portion (e.g., substantially all) of the stator periphery. In examples, the stator apparatus is configured to define a plurality of phases for a polyphase rotating machine, and the stator apparatus includes an individual wave winding corresponding to each phase.

The plurality of stator slots may include at least a first stator slot cluster, a second stator slot cluster, and a third stator slot cluster. The second stator slot cluster may be between the first stator slot cluster and the third stator slot cluster along the stator periphery. A flexible conductor of an individual wave-winding coil may be mechanically supported by the first stator slot cluster, the second stator slot cluster, and the third stator slot cluster. For example, the flexible conductor may define a first conductor portion and a second conductor portion between the first end and the second end of the conductor. The first conductor portion may wind through the first stator slot cluster, the second stator slot cluster, and the third stator slot cluster to define a primary overhang extending from the first stator slot cluster to the second stator slot cluster and a first secondary overhang extending from the second stator slot cluster to the third stator slot cluster. The first primary overhang may extend over the front side and the secondary overhang may extend over the back side.

The second conductor portion may wind through the first stator slot cluster, the second stator slot cluster, and the third stator slot cluster to define a second primary overhang extending from the first stator slot cluster to the second stator slot cluster and a second secondary overhang extending from the second stator slot cluster to the third stator slot cluster. In examples, the second conductor portion is wound through the first stator slot cluster, the second stator slot cluster, and the third stator slot cluster such that the first conductor portion and the second conductor portion define a double-layer winding arrangement in the first stator slot cluster, the second stator slot cluster, and the third stator slot cluster. The second primary overhang may extend over the back side and the second secondary overhang may extend over the front side. In other words, each conductor portion defines a primary overhang section which extends between the first stator slot cluster and the second stator slot cluster, extending over either the front side or the back side of the stator core. Similarly, each conductor portion defines a secondary overhang section which extends between the second stator slot cluster and the third stator slot cluster, extending over either the front side or back side of the stator core. As will be discussed, the flexible conductor of the individual wave-winding coil may be further wound through the remaining stator slot clusters of a slot group in a generally similar manner, such that the flexible conductor is substantially wound around the periphery of the stator core.

A slot group may be defined as comprising each Nth stator slot around the inner periphery of the stator core in a stator apparatus configured for an N-phase rotating machine. For example, a stator apparatus configured for a six-phase machine may have six slot groups. A slot group configured for an N-phase rotating machine may have (N–1) intervening stator slots between each of the stator slots comprising the slot group. Each individual wave-winding coil may wind through each member slot of a slot group around the inner periphery of the stator core as a continuous conductor. In other words, an individual slot group may comprise all individual stator slots about the stator periphery that mechanically support the same electrical phase. For example, for a six-phase machine, the first slot group may comprise stator slots 1, 7, 13, 19, and so on, when each stator slot about the periphery is assigned a stator slot number and the first slot group is comprised of every sixth stator slot according to the described pattern. The first wave-winding coil winds through each member slot of the first slot group as a continuous conductor. The second slot group then accordingly comprises stator slots 2, 8, 14, 20, and so on, with a second wave-winding coil comprising a continuous conductor winding through each member slot of the second slot group. Accordingly, each slot group may correspond with an individual wave-winding coil, and each wave-winding coil may be a continuous, unitary, flexible conductor. When the rotating machine is configured to act as a generator electrical power from the ends of each wave-winding coil may be withdrawn as each wave-winding coil interacts with a magnetic field. When the rotating machine is configured to act as a motor, electrical power may be supplied to the wave-winding coils to generate a rotating magnetic field.

In accordance with the example of this disclosure, a technique is provided to wave-wind the stator apparatus.

FIG. 1 is a perspective view illustrating an example rotating machine 160. Rotating machine 160 comprises a stator apparatus 100, a rotor 170, and a controller 190. Stator apparatus 100 defines a periphery 103 substantially surrounding an axis L defined by stator apparatus 100. A plurality of wave-winding coils 124 are wound substantially around the periphery 103. The plurality of wave-winding coils 124 may be mechanically supported by stator slots (not shown) defined by stator apparatus 100. In examples, one or more stator slots are substantially parallel to axis L. Rotor 170 is configured to rotate relative to stator apparatus 100 around axis L.

In examples, rotating machine 160 is configured to act as a motor, such that rotating machine 160 substantially converts electrical power received by stator apparatus 100 into a rotary motion of rotor 170 around axis L. Stator apparatus 100 may be configured to receive a polyphase power (e.g., a polyphase voltage) and generate a rotating magnetic field using the polyphase power. In examples, stator apparatus 100 is configured such that a single phase of the polyphase power is provided to each wave-winding coil in the plurality of wave-winding coils 124, such that as the single phases are provided, the plurality of wave-winding coils 124 generates a resultant magnetic field which rotates around axis L. The rotating magnetic field may act on rotor 170 across an air gap 176 substantially between stator apparatus 100 and rotor 170, inducing a torque and generating a rotary motion of rotor 170 around axis L. Controller 190 may be configured to provide the electrical power (e.g., the polyphase power) to the plurality of wave-winding coils 124 to cause the plurality of wave-winding coils 124 to generate the rotating magnetic field.

In examples, rotating machine 160 is configured to act as a generator, such that rotating machine 160 substantially converts mechanical power imparted to rotor 170 into electrical power generated by stator apparatus 100. Rotating machine 160 may be configured such that the mechanical power causes a rotation of rotor 170 around axis L, causing a rotor field (not shown) to correspondingly rotate around axis L. The rotating rotor field may act on the plurality of wave-winding coils 124 across air gap 176, inducing electrical power within the plurality of wave-winding coils 124. In examples, stator apparatus 100 is configured such that each wave-winding coil generates a single-phase power signal as the rotating rotor field interacts with the wave-winding coil, such that the plurality of wave-winding coils 124 together generate a polyphase electric power. Controller 190 may be configured to draw the electrical power (e.g., the polyphase electric power) from the plurality of wave-winding coils 124 and provide the electrical power to, for example, an electrical distribution system servicing one or more electrical loads.

Figure 2:
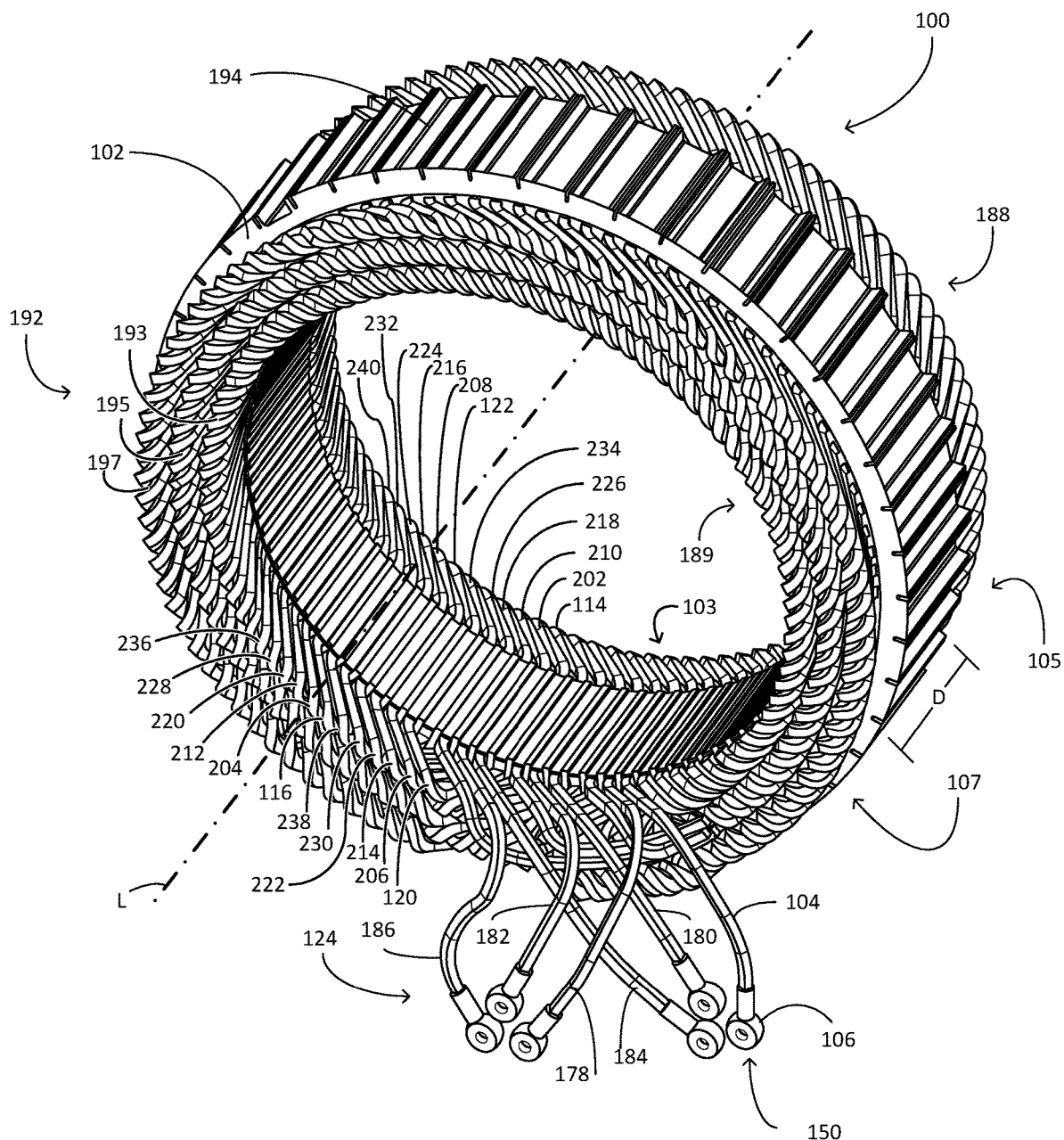
FIG. 2 is a perspective view illustrating an example stator apparatus.

FIG. 2 is a perspective view illustrating stator apparatus 100. The stator apparatus 100 includes a stator core 102 and the plurality of wave-winding coils 124. The plurality of wave-winding coils 124 includes a plurality of individual wave-winding coils, such as wave-winding coil 104. Wave-winding coil 104 includes a flexible conductor extending substantially from a first end 150 to a second end (not shown). In examples, a first electrical connector 106 substantially defines first end 150 of wave-winding coil 104. A second electrical connector (not shown) may substantially define the second end of wave-winding coil 104. The flexible conductor of wave-winding coil 104 may be wound through and/or mechanically supported by stator slots around the periphery 103 (e.g., individual stator slots defining a first slot group) such that the flexible conductor surrounds axis L as it extends between first end 150 and the second end of wave-winding coil 104.

In examples, wave-winding coil 104 is a Litz-wire. The flexible conductor may be one of a plurality of flexible conductors comprising the Litz-wire. The Litz-wire may be a multistrand wire or cable with each of the plurality of strands electrically insulated from the other strands. Each of the plurality of strands may substantially extend from a first end of the Litz-wire to a second end of the Litz-wire, with each strand configured to provide electrical communication between the first and second end of the Litz-wire. The flexible conductor may also be single or multi-stranded copper, aluminum, gold, or the like of a suitable gauge. Electrical connector 106 can be a bare conductive section of the flexible conductor, one half of a plug and socket connector, a crimp-on connector, a ring and spade connector, a keyed connector, a blade connector, an alligator clip, or the like.

The plurality of wave-winding coils 124 may include individual wave-winding coils in addition to wave-winding coil 104, such as wave-winding coil 178, wave-winding coil 180, wave-winding coil 182, wave-winding coil 184, and wave-winding coil 186. Wave-winding coil 178, 180, 182, 184, 186 may each include a flexible conductor extending from a first end of the wave-winding coil to a second end of the wave-winding coil. In examples, an electrical connector may substantially define the first end of the wave-winding coil. The second end of the wave-winding coil may also be defined by an electrical connector. In some examples, a two or more respective ends of wave-winding coil 178, wave-winding coil 180, wave-winding coil 182, wave-winding coil 184, and/or wave-winding coil 186 may be electrically connected to an electrical common (e.g., a neutral), such as a star point. For example, the second end of wave-winding coil 104, the second end of wave-winding coil 180, and the second end of wave-winding coil 184 may be electrically connected to a star point.

The flexible conductor of each wave-winding coil 178, 180, 182, 184, 186 may be wound through and/or mechanically supported by stator slots about periphery 103 such that each flexible conductor surrounds axis L as it extends between the first end and second end of each wave-winding coil. Each wave-winding coil 178, 180, 182, 184, 186 may be wound through and/or mechanically supported by stator slots defining an individual slot group, such that each individual slot group mechanically supports at least one of wave-winding coil 178, 180, 182, 184, 186. In examples, stator slots defining an individual slot group mechanically support one of wave-winding coil 178, 180, 182, 184, 186. Each of wave-winding coil 178, 180, 182, 184, 186 may define one pole of a stator apparatus configured for an N-phase rotating machine. For example, FIG. 2 depicts a stator winding configured for a 6-phase rotating machine, with each of wave-winding coil 104, wave-winding coil 178, wave-winding coil 180, wave-winding coil 182, wave-winding coil 184, and wave-winding coil 186 defining a single phase of the 6-phase rotating machine. Stator apparatus 100 may have any number of wave-winding coils defining any number of phases. In examples, one or more of wave-winding coil 178, 180, 182, 184, 186 is a Litz-wire. One or more of wave-winding coil 178, 180, 182, 184, 186 may be a single or multi-stranded wire made of copper, aluminum, gold, or the like of a suitable gauge.

Stator core 102 defines a front side 105, a back side 107, and an axis L. Back side 107 may be displaced from front side 105 along axis L by a displacement D substantially parallel to axis L. Stator core 102 defines inner periphery 103 substantially between front side 105 and back side 107. Inner periphery 103 of the stator core may define an inner surface defining the stator slots of stator core 102 and configured to surround the axis L. In examples, stator core 102 defines an outer surface 194 substantially facing away from axis L, and stator core 102 is configured such that inner periphery 103 is between outer surface 194 and axis L.

The plurality of wave-winding coils 124 are mechanically supported by stator core 102 such that the plurality of wave-winding coils 124 substantially wind around periphery 103. The plurality of wave-winding coils 124 may define a plurality of front overhangs 188 extending over front side 105 and may define a plurality of back overhangs 189 extending over back side 107. The plurality of front overhangs 188 and/or the plurality of back overhangs 189 may include both primary overhangs and secondary overhangs as described herein (e.g., as wave-winding coil 104, 178, 180, 182, 184, 186 is wound around periphery 103). The primary and secondary overhangs, or end-windings, are produced when the flexible conductor comprising each wave-winding coil 124 bends between stator slots. The flexibility of wave-winding coils 124 allows the front overhangs 188 and back overhangs 189 to be packed together tightly, resulting in a short end winding arrangement. Each of the plurality of wave-winding coils 124 may be insulated between a first end and a second end. by an insulative layer substantially surrounding the each wave-winding coil between the respective first end and second end. In other words, each of the plurality of wave-winding coils 124 may be substantially continuous, with no electrical tap offs providing electrical connection to other conductors between a first end of a conductor and a second end of a conductor. For example, each of the plurality of wave-winding coils 124 may have substantially no electrical tap offs between a lead-in to the stator winding and a lead out from a stator winding, such as to a star/neutral point.

As an example, FIG. 2 illustrates wave-winding coil 104 defining a first primary overhang 114, a first secondary overhang 116, a second primary overhang 120, and a second secondary overhang 122. First primary overhang 114, first secondary overhang 116, second primary overhang 120, and second secondary overhang 122 are additionally illustrated at FIGS. 5A and 5B, as will be discussed. Wave-winding coil 178 defines a first primary overhang 202, a first secondary overhang 204, a second primary overhang 206, and a second secondary overhang 208. Wave-winding coil 180 defines a first primary overhang 210, a first secondary overhang 212, a second primary overhang 214, and a second secondary overhang 216. Wave-winding coil 182 defines a first primary overhang 218 a first secondary overhang 220, a second primary overhang 222, and a second secondary overhang 224. Wave-winding coil 184 defines a first primary overhang 226, a first secondary overhang 228, a second primary overhang 230, and a second secondary overhang 232. Wave-winding coil 186 defines a first primary overhang 234, a first secondary overhang 236, a second primary overhang 238, and a second secondary overhang 240.

Figure 7:
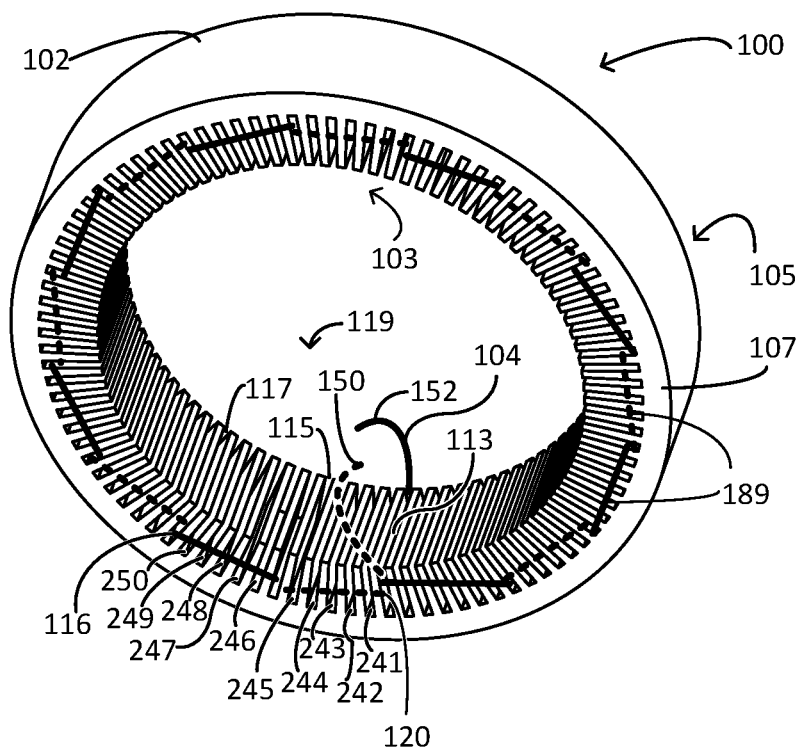
FIG. 7 is a perspective view illustrating example primary and secondary overhangs extending from the back side of a stator apparatus.

Stator core 102 may support the plurality of wave-winding 124 such that the primary overhangs and/or second overhangs defining the plurality of front overhangs 188 and/or the plurality of back overhangs 189 are interleaved. In examples, the plurality of wave-windings 124 are mechanically supported by stator core 102 in a circumferential order around periphery 103 of stator core 102 (e.g., in an order defined in a clockwise or counterclockwise direction around periphery 103), and the primary overhangs and/or second overhangs interleave based on the circumferential order. For example, FIG. 7 illustrates the plurality of wave-windings 124 mechanically supported by stator core 102 in the circumferential order (e.g., a clockwise order viewed from back side 107): wave-winding coil 104-wave-winding coil 178-wave-winding coil 180-wave-winding coil 182-wave-winding coil 184-wave-winding coil 186 ("104-178-180-182-184-186"). In examples, stator core 102 mechanically supports the plurality of wave-winding coils 124 such that the primary overhangs and/or secondary overhangs defined interleave (e.g., substantially stack) in the same order as the circumferential order of the plurality of wave-winding coils 124. Stated similarly, in some examples, when stator core 102 mechanically supports the plurality of wave-winding coils 124 in the circumferential order 104-178-180-182-184-186, the primary overhangs defined by the plurality of wave-winding coils 124 interleave in the circumferential order 104-178-180-182-184-186. When stator core 102 mechanically supports the plurality of wave-winding coils 124 in the circumferential order 104-178-180-182-184-186, the secondary overhangs defined by the plurality of wave-winding coils 124 interleave in the circumferential order 104-178-180-182-184-186.

In examples, the plurality of wave winding coils 124 define a plurality of winding layers 192, such as winding layer 193, winding layer 195, and/or winding layer 197. A winding layer (e.g., one of winding layer 193, 195, or 197) may be defined when each of the plurality of wave-winding coils 124 is mechanically supported by the stator slots of stator core 102 and wound around periphery 103 over substantially one complete circumference of periphery 103. In examples, each of the plurality of wave-winding coils 124 are mechanically supported by stator core 102 such that each of the plurality of wave-winding coils 124 define a double-layer arrangement within the stator slots of an individual slot group for each substantially complete circumference of periphery 103. The double-layer arrangement may be defined when each of the stator slots (not shown) about periphery 103 mechanically supports a first conductor portion and a second conductor portion defined by one of the plurality of wave-winding coils 124. In examples, the double-layer arrangement may be defined when the second conductor portion substantially lays atop the first conductor portion (or vice-versa) within a stator slot.

Figure 3A:
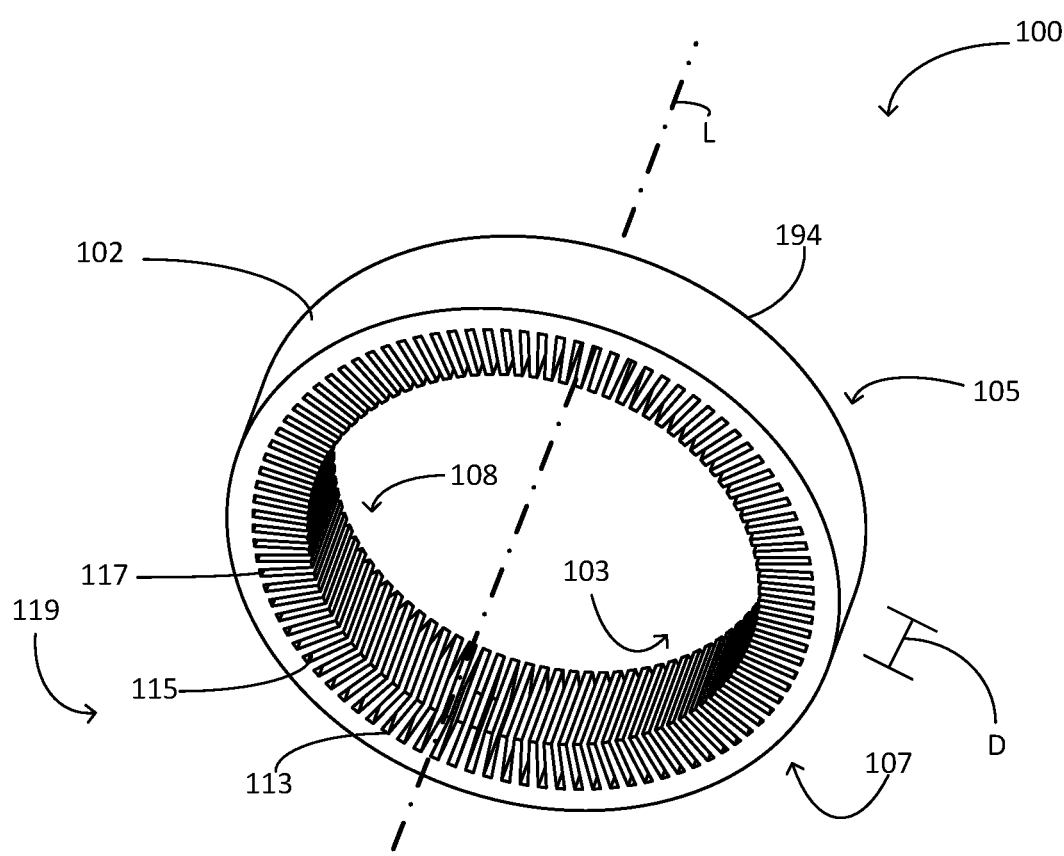
FIG. 3A is a perspective view illustrating an example stator core.

FIG. 3A is a perspective view illustrating stator core 102 including front side 105, back side 107, and inner periphery 103. Stator core 102 may define a plurality of stator slots 108 about inner periphery 103 of the stator core. Stator core 102 defines at least a first stator slot 113, a second stator slot 115, and a third stator slot 117. In some examples, typically where stator apparatus 100 is wound in a conventional distributed winding pattern, a first stator slot cluster consists of first stator slot 113, a second stator slot cluster consists of second stator slot 115, and a third stator slot cluster consists of third stator slot 117. In other words, a stator slot cluster may only include one individual stator slot of the plurality of stator slots 108. FIGS. 1-2, 4A-5B, and 7-13 illustrate an example stator apparatus with a conventional distributed winding arrangement. Accordingly, first stator slot 113 defines the first stator slot cluster, second stator slot 115 defines the second stator slot cluster, and third stator slot 117 defines the third stator slot cluster. FIG. 6, discussed below, introduces an example fractional winding arrangement in accordance with the present disclosure, where a stator slot cluster may consist of more than one individual stator slot.

First stator slot 113, second stator slot 115, and third stator slot 117 may be defined by periphery 103. First stator slot 113 and second stator slot 115 can be separated by a first number of intervening stator slots. In examples, first stator slot 113, second stator slot 115, and/or third stator slot 117 extend from front side 105 to back side 107. In examples, stator apparatus 100 is configured for a machine (e.g., rotating machine 160 (FIG. 1)) having N phases, and the number of intervening stator slots is equal to (N−1). In examples, stator core 102 is configured to mechanically support a quantity of N windings such as wave-winding coil 104, wave-winding coil 178, wave-winding coil 180, wave-winding coil 182, wave-winding coil 184, and wave-winding coil 186 (FIG. 2), and the number of intervening stator slots is equal to (N−1). For example, the first number of intervening stator slots may be five for a six-phase electrical machine. Second stator slot 115 and third stator slot 117 may be separated by a second number of intervening stator slots. The first number of intervening stator slots and the second number of intervening stator slots may be equal. For example, the second number may also be five for a six-phase electrical machine (e.g., equal to (N−1)). The second stator slot 115 may be located between the first stator slot 113 and the third stator slot 117 along the periphery 103 of the stator.

In examples, an "intervening stator slot" means a stator slot mechanically supporting at least a first conductor portion of a wave-winding coil and/or a second conductor portion of a wave-winding coil when the stator core of the stator apparatus mechanically supports the wave-winding coil. In some examples, the stator core may define additional slots such as dummy slots or other types of slots that may be present substantially between a first stator slot and a second stator slot or a second stator slot and a third stator slot. Such additional slots may not be "intervening stator slots" as used herein.

It is understood that any three of the plurality of stator slots 108 may comprise first stator slot 113, second stator slot 115, and third stator slot 117, provided first stator slot 113, second stator slot 115, and third stator slot 117 are configured relative to each other in the manners disclosed herein. Further, although the examples below describe a manner in which an individual wave-winding coil (e.g., wave-winding coil 104) is wound through and mechanically supported through first stator slot 113, second stator slot 115, and third stator slot 117 in a portion of stator core 102 defining a portion of periphery 103, the individual wave-winding coil may be wound through and mechanically supported by additional stator slots defined by periphery 103 of stator core 102. In examples, the individual wave-winding coil is wound through and mechanically supported by substantially all of the stator slots comprising a given slot group. The individual wave-winding coil may be wound through and mechanically supported by substantially all of the stator slots comprising a given slot group in a manner similar to that described for first stator slot 113, second stator slot 115, and third stator slot 117. Further, the individual wave winding coil may be wound through first stator slot 113, second stator slot 115, and third stator slot 117 one or more times in the manner described such that, for example, stator apparatus 100 may define one or more winding layers such as winding layer 193, winding layer 195, and/or winding layer 197 (FIG. 2).

First stator slot 113, second stator slot 115, and third stator slot 117 may be slots within a first slot group 119. In examples, first slot group 119 may include additional stator slots about periphery 103. The additional stator slots within first slot group 119 may be separated from other members of the first slot group 119 by at least the same number of intervening stator slots as the first number and second number of intervening stator slots. For example, first slot group 119 may include first stator slot 113, second stator slot 115, third stator slot 117, and additional stator slots positioned along periphery 103 according to the pattern established by the first, second, and third stator slots. In examples, when first stator slot 113 and second stator slot 115 are separated by (N−1) stator slots and/or second stator slot 115 and third stator slot 117 are separated by (N−1) stator slots, each stator slot in the first slot group 119 may be separated from a neighboring (e.g., closest) stator slot in the first stator group by (N−1) stator slots. For example, when stator core 102 is configured to mechanically support a plurality of wave-winding coils 124 for a six-phase electrical machine, each member slot of the first slot group 119 may be separated from its neighboring stator slots in first slot group 119 by five intervening stator slots.

In examples, stator apparatus 100 is configured as an N-phase stator apparatus, and first slot group 119 defines a single phase of the N-phase stator apparatus. Additional slot groups may be defined, with each additional slot group defining a phase of stator apparatus 100. For example, a second slot group may comprise each adjacent stator slot to each member stator slot of the first slot group 119 in one circumferential direction about periphery 103. For a stator apparatus having N phases, the total number of slot groups may be N. A stator apparatus having six phases may have six slot groups, each comprising a corresponding first, second, and third stator slot. Each slot group may mechanically support a wave-winding coil (e.g., one of wave-winding coil 104, 178, 180, 182, 184, 186) corresponding to one phase of an electrical power signal stator apparatus 100 is configured to receive and/or produce.

Figure 3B:
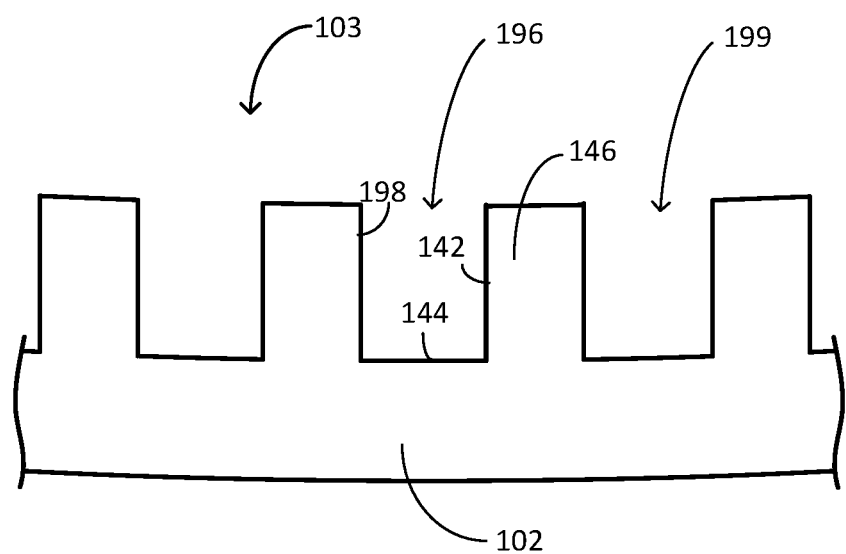
FIG. 3B is a cross-sectional view of a portion of the stator core of FIG. 3A.

FIG. 3B is a cross-sectional front-end view illustrating a portion of stator apparatus 100 including an example stator slot 196. The cross-section of FIG. 3B is taken with a cutting plane parallel to the page and perpendicular to the axis L of FIGS. 1-3A. FIG. 3B Stator slot 196 may be an example of first stator slot 113, second stator slot 115, third stator slot 117, and/or another stator slot defined by stator core 102. Stator slot 196 may have an open, semi-closed, or tapered geometry and can vary in depth, size, and cross-sectional area. Each stator slot 108 may comprise one or more stator slot walls such as first stator slot wall 142 and second stator slot wall 198 configured to substantially face first stator slot wall 142 and a stator slot bottom 144 extending from first stator slot wall 142 to second stator slot wall 198. First stator slot wall 142, second stator slot wall 198 and stator slot bottom 144 may be covered in an insulating material. Stator slot 196 may be separated from an adjacent stator slot 199 by a stator tooth 146. In some examples, stator slot 196 may be integral with stator core 102, such that stator core 102 defines stator slot wall 142, 198, and stator slot bottom 144 as sections of a substantially contiguous material. In other examples, stator slot 196 may be defined by a plurality of joined laminates or other joined materials comprising stator core 102.

As discussed, the stator slots of an individual slot group mechanically support one of the individual wave-winding coils in the plurality of wave-winding coils 124. The individual wave-winding coil may be wound through the stator slots of the individual slot group substantially around periphery 103, such that the individual wave-winding coil defines a plurality of front overhangs 188 (FIG. 2) extending over front side 105 and a plurality of back overhangs 189 (FIG. 2) extending over back side 107. The individual wave-winding coil may be wound through the stator slots of the individual slot group such that a first conductor portion of the individual wave-winding coil and a second conductor portion of the individual wave-winding coil define a double layer arrangement in the stator slots as individual wave winding coil extends around periphery 103 to define a portion of a winding layer.

Figure 4A:
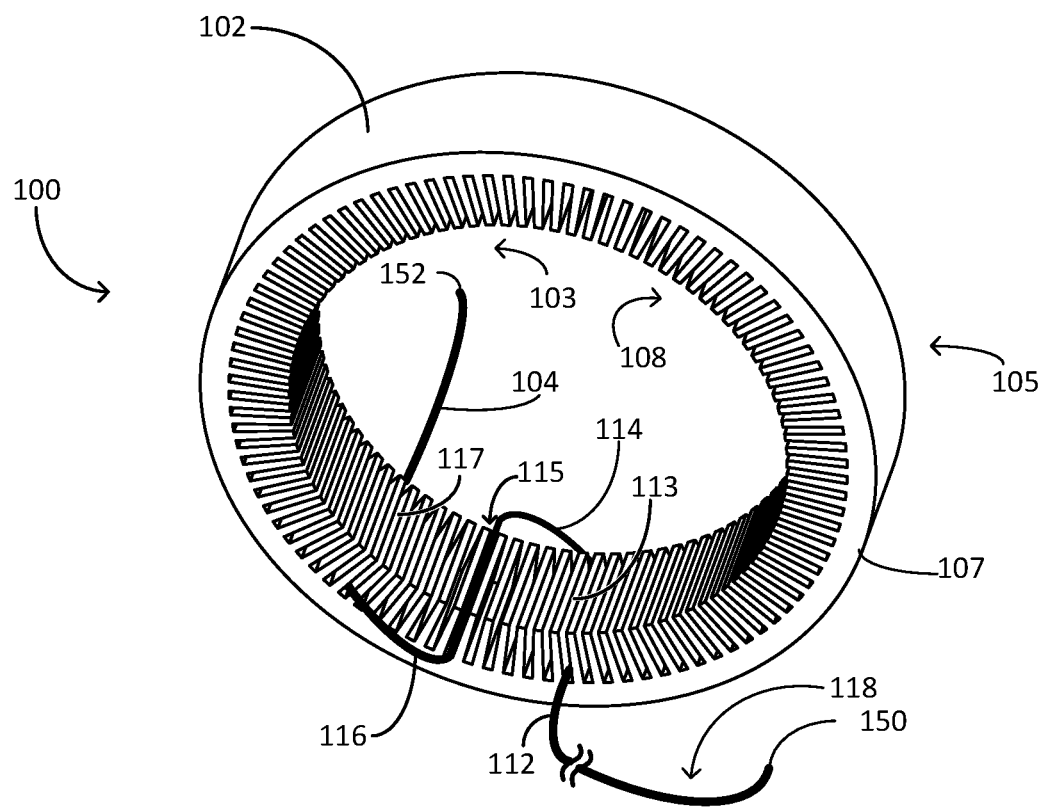
FIG. 4A is a perspective view illustrating an example wave-winding coil defining a first conductor portion wound through a first stator slot cluster, second stator slot cluster, and third stator slot cluster wherein the first, second, and third stator slot clusters comprise a first individual stator slot, a second individual stator slot, and a third individual stator slot
Figure 4B:
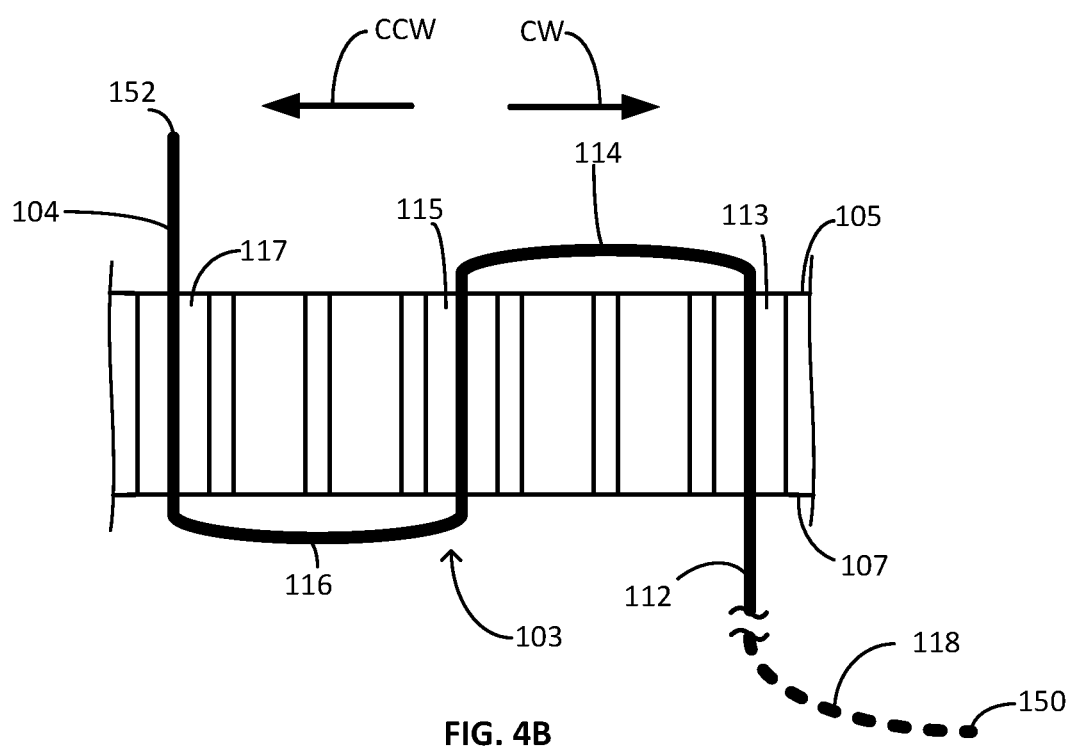
FIG. 4B is a schematic view illustrating the wave-winding coil of FIG. 4A having a first conductor portion wound through a first stator slot cluster, second stator slot cluster, and third stator slot cluster.
Figure 5A:
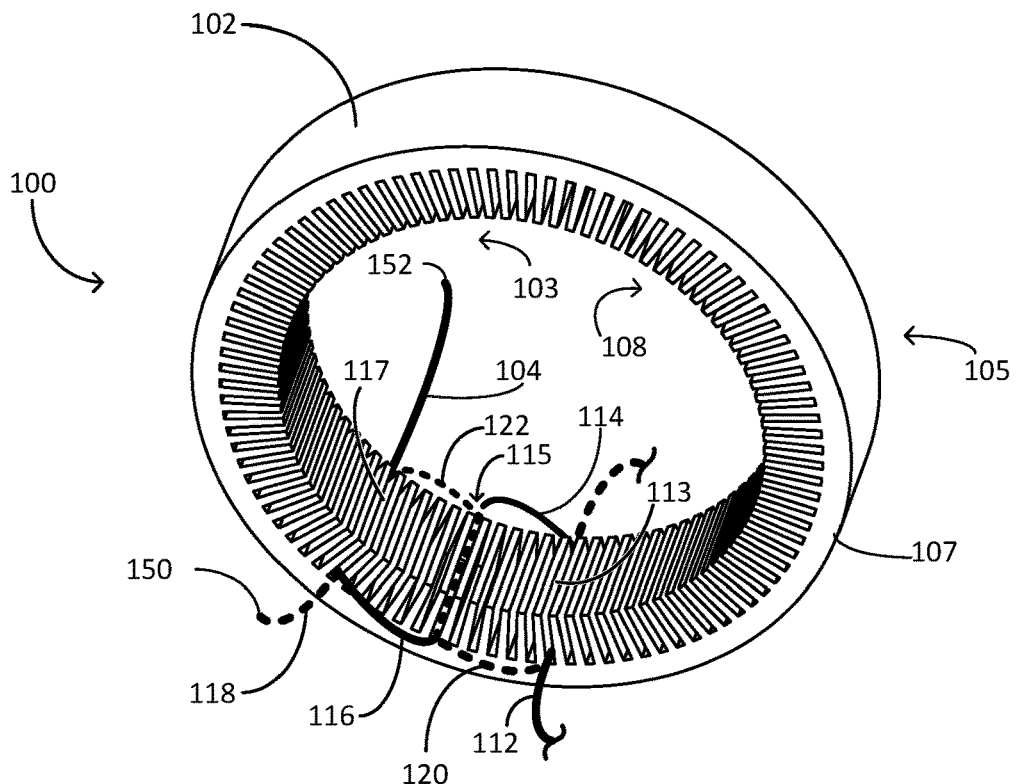
FIG. 5A is a perspective view illustrating an example wave-winding coil with a first conductor portion and a second conductor portion each wound through a first stator slot cluster, second stator slot cluster, and third stator slot cluster.
Figure 5B:
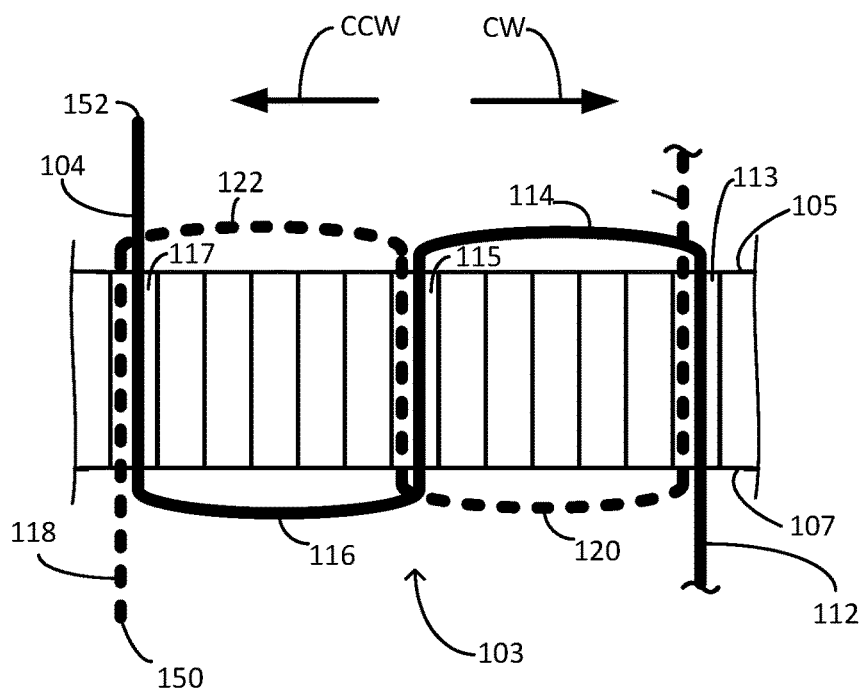
FIG. 5B is a schematic view illustrating the wave-winding coil of FIG. 5A having a first conductor portion and a second conductor portion each wound through a first stator slot cluster, second stator slot cluster, and third stator slot cluster.
Figure 6:
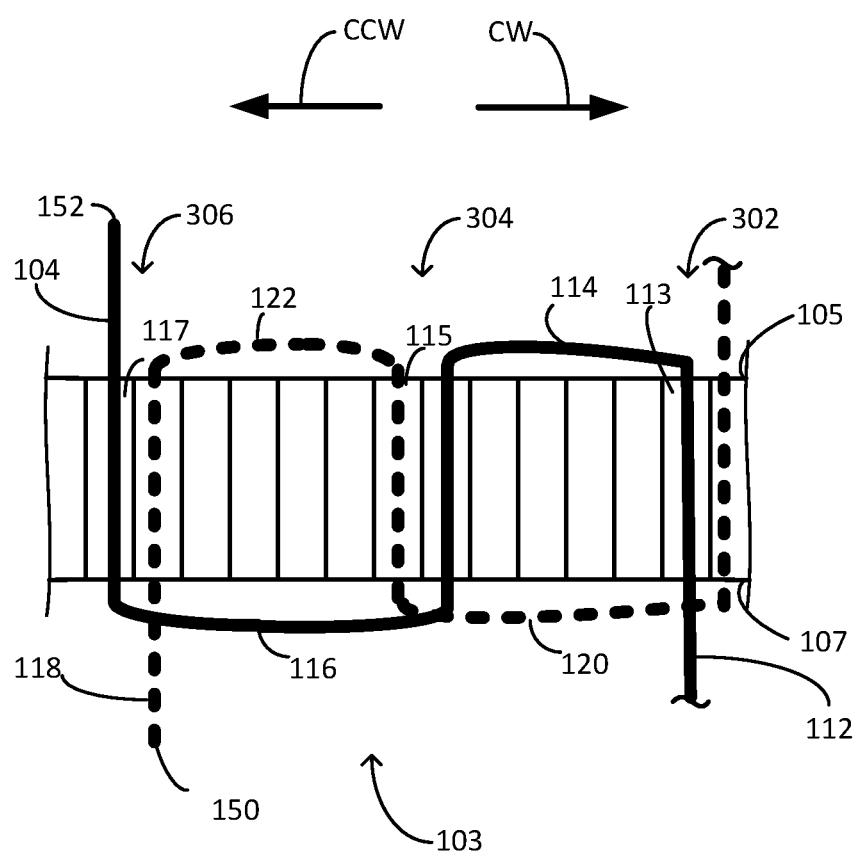
FIG. 6 is a schematic view illustrating an alternative example wave-winding coil having a first conductor portion and a second conductor portion each wound through a first stator slot cluster, second stator slot cluster, and third stator slot cluster.

FIG. 4A, FIG. 4B, FIG. 5A, and FIG. 5B illustrate a portion of wave-winding coil 104 wound through and mechanically supported by first stator slot 113, second stator slot 115, and third stator slot 117. Wave-winding coil 104 includes a first conductor portion 112 and a second conductor portion 118 between a first end 150 of wave-winding coil 104 and a second end 152 of wave-winding coil 104. Hence, first conductor portion 112 and second conductor portion 118 may be portions of a unitary, flexible conductor extending from first end 150 to second end 152. FIG. 4A illustrates a perspective view of first conductor portion 112 mechanically supported by first stator slot 113, second stator slot 115, and third stator slot 117, with FIG. 4B illustrating a schematic view of a portion of inner periphery 103 of stator core 102. FIG. 5A illustrates a perspective view of second conductor portion 118 mechanically supported by first stator slot 113, second stator slot 115, and third stator slot 117, along with first conductor portion 112. FIG. 5B illustrates a schematic view of the portion of inner periphery 103 mechanically supporting second conductor portion 118 and first conductor portion 112. FIG. 5A and FIG. 5B illustrate second conductor portion 118 as a dashed line for clarity. Further, although FIG. 5B illustrates first conductor portion 112 and second conductor portion 118 in a substantially side-by-side arrangement for clarity, in examples, first conductor portion 112 and second conductor portion 118 may be configured to define a double-layer in first stator slot 113, second stator slot 115, and third stator slot 117.

Further, as discussed above, wave-winding coil 104 extends from first end 150 to second end 152. Thus, while FIG. 4A, FIG. 4B, FIG. 5A, and FIG. 5B illustrate the physical arrangement of wave-winding coil 104, the physical arrangement described may apply to any of the plurality of wave-winding coils 124. Each of the plurality of wave-winding coils 124 may be wound through their corresponding slot group and to produce an interleaved winding layer, such as winding layer 193, 195, and/or 197 (FIG. 2).

Referring primarily to FIG. 4B and FIG. 5B, first conductor portion 112 defines a first primary overhang 114 and first secondary overhang 116. Second conductor portion 118 (FIG. 5B) defines a second primary overhang 120 and second secondary overhang 122. First conductor portion 112 and second conductor portion 118 are mechanically supported by first stator slot 113, second stator slot 115, and third stator slot 117 such that first conductor portion 112 and second conductor portion 118 define a double-layer winding in each of first stator slot 113, second stator slot 115, and third stator slot 117. First conductor portion 112 and second conductor portion 118 are portions of a flexible conductor extending from first end 150 to second end 152. First end 150 and second end 152 are illustrated schematically in FIGS. 4A-5B and may located elsewhere relative to stator core 102.

First primary overhang 114 may extend from first stator slot 113 to second stator slot 115. First primary overhang 114 may extend over front side 105. First secondary overhang 116 may extend from second stator slot 115 to third stator slot 117. First secondary overhang 116 may extend over back side 107. Wave-winding coil 104 may include a flexible conductor and be mechanically supported by first stator slot 113, second stator slot 115, and third stator slot 117 such that it substantially bends to define first primary overhang 114 and/or first secondary overhang 116. Hence, wave-winding coil 104 may define first primary overhang 114 and/or first secondary overhang 116 as a substantially unitary component without requiring extra components or hardware. In examples, first conductor portion 112 is mechanically supported within first stator slot 113, second stator slot 115, and third stator slot 117 such that when first end 150 has a higher voltage potential than second end 152, an electrical current flowing in first conductor portion 112 from first end 150 to second end 152 flows in a direction from back side 107 to front side 105 through first stator slot 113, flows in a direction from front side 105 to back side 107 through second stator slot 115, and flows in a direction from back side 107 to front side 105 through third stator slot 117. If second end 152 has a higher voltage potential than first end 150, the electrical current flows through first stator slot 113 in a direction from front side 105 to back side 107, flows through second stator slot 115 in a direction from back side 107 to front side 105, and flows through third stator slot 117 in a direction from front side 105 to back side 107.

FIG. 5A illustrates second conductor portion 118 of wave-winding coil 104 wound through first stator slot 113, second stator slot 115, and third stator slot 117. Second conductor portion 118 is wound such that first stator slot 113, second stator slot 115, and third stator slot 117 each mechanically support both of first conductor portion 112 and second conductor portion 118, as illustrated in FIG. 5B. As discussed above, the flexible conductor of wave-winding coil 104 defines both first conductor portion 112 and second conductor portion 118. Second conductor portion 118 may define a second primary overhang 120 extending from first stator slot 113 to second stator slot 115. The second primary overhang may extend over back side 107. Second conductor portion 118 may further define a second secondary overhang 122 extending from second stator slot 115 to third stator slot 117. The second secondary overhang may extend over front side 105. First conductor portion 112 and second conductor portion 118 may each occupy first stator slot 113, second stator slot 115, and third stator slot 117. Second conductor portion 118 may be overlaid on first conductor portion 112 in first stator slot 113 and third stator slot 117, and first conductor portion 112 may be overlaid on second conductor portion 118 in second stator slot 115 such that the conductor portions are stacked in a radial direction in the stator slots 108. Wound in this manner, wave-winding coil 104 is configured to pass through each slot twice, going in opposite directions, alternating which layer is first, creating a double-layer.

As discussed, second conductor portion 118 is a portion of wave-winding coil 104, which may include a flexible conductor. The flexible conductor may be configured to substantially bend to define second primary overhang 120 and second secondary overhang 122, such that wave-winding coil 104 defines first primary overhang 114 and/or second secondary overhang 122 as a substantially unitary component without requiring extra components or hardware. Hence, the flexible conductor of wave-winding coil 104 may be a continuous, unitary conductor defining first conductor portion 112 and second conductor portion 118, such that the continuous, unitary conductor defines first primary overhang 114, first secondary overhang 116, second primary overhang 120, and second secondary overhang 122 as first stator slot 113, second stator slot 115, and third stator slot 117 mechanically support the continuous, unitary conductor.

Second conductor portion 118 is mechanically supported within first stator slot 113, second stator slot 115, and third stator slot 117 such that when first end 150 has a higher voltage potential than second end 152, an electrical current flowing in second conductor portion 118 from first end 150 to second end 152 flows in a direction from back side 107 to front side 105 through first stator slot 113, flows in a direction from front side 105 to back side 107 through second stator slot 115, and flows in a direction from back side 107 to front side 105 through third stator slot 117. If second end 152 has a higher voltage potential than first end 150, the electrical current flows through first stator slot 113 in a direction from front side 105 to back side 107, flows through second stator slot 115 in a direction from back side 107 to front side 105, and flows through third stator slot 117 in a direction from front side 105 to back side 107. Second conductor portion 118 may thus be configured to produce the same direction of current flow in each of first stator slot 113, second stator slot 115, and third stator slot 117 as first conductor portion 112 when first stator slot 113, second stator slot 115, and third stator slot 117 mechanically support first conductor portion 112 and second conductor portion 118.

FIG. 6 is a schematic view illustrating an example fractional wave-winding arrangement according to the present disclosure. As in FIG. 5B above, first conductor portion 112 and second conductor portion 118 may each be portions of wave-winding coil 104. Unlike the conventional winding arrangement illustrated in FIGS. 4A-5B, where first stator slot 113 makes up the entire first stator slot cluster, second stator slot 115 makes up the entire second stator slot cluster, and third stator slot 117 makes up the entire third stator slot cluster, FIG. 6 illustrates an example fractional winding arrangement, where stator slot clusters include more than one individual stator slot. First stator slot cluster 302 includes first stator slot 113 and the adjacent stator slot in either a clockwise direction CW or a counterclockwise direction CCW about periphery 103. Second stator slot cluster 304 includes second stator slot 115 and the adjacent stator slot in the same direction about the periphery (e.g., CW or CCW) as the adjacent stator slot relative to first stator slot 113. Third stator slot cluster 306 includes third stator slot 117 and the adjacent stator slot in the same direction (e.g., CW or CCW) as the adjacent slots relative to first stator slot 113 and second stator slot 115.

First conductor portion 112 may be mechanically supported by first stator slot 113 located within first stator slot cluster 302, the stator slot adjacent to second stator slot 115 located within second stator slot cluster 304, and third stator slot 117 located within third stator slot cluster 306. First conductor portion 112 may be mechanically supported by stator slot clusters 302, 304, and 306 such that first primary overhang 114 extends over front side 105 between first stator slot cluster 302 and second stator slot cluster 304 and second primary overhang 116 extends over back side 107 between second stator slot cluster 304 and third stator slot cluster 306.

Second conductor portion 118 may be mechanically supported by the stator slot adjacent to first stator slot 113 located within first stator slot cluster 302, second stator slot 115 located within second stator slot cluster 304, and the stator slot adjacent to third stator slot 117 located within third stator slot cluster 306. Second conductor portion 118 may be mechanically supported by stator slot clusters 302, 304, and 306 such that second primary overhang 120 extend over back side 107 between first stator slot cluster 302 and second stator slot cluster 304 and second primary secondary overhang 122 extends over front side 105 between second stator slot cluster 304 and third stator slot cluster 306. Second conductor portion 118 may be on the radially inner side (closer to the axis) of first conductor portion 112 as the first conductor portion 112 and second conductor portion 118 cross near first stator slot cluster 302 and third stator slot cluster 306. First conductor portion 112 may be on the radially inner side of second conductor portion 118 as the first conductor portion 112 and the second conductor portion 118 cross near second stator slot cluster 304. Mechanically supported in this manner, wave-winding coil 104 is configured to pass through each slot cluster twice, going in opposite directions, alternating which layer is first, creating a double-layer.

In the fractional winding arrangement example illustrated in FIG. 6, first, second, and third stator slot clusters include first stator slot 113 and the adjacent stator slot immediately to its right (counterclockwise), second stator slot 115 and the adjacent stator slot immediately to its right (counterclockwise), and third stator slot 117 and the adjacent stator slot immediately to its right (counterclockwise), respectively. In some examples, a stator slot cluster may include one or more intervening slots between its member slots. In some examples, the number of intervening slots may be one, two, or three stator slots.

FIG. 7 is a perspective view illustrating wave-winding coil 104 as a single length of a flexible conductor wound through each stator slot in first slot group 119. For clarity, FIG. 7 illustrates wave-winding coil 104 wound on stator core 102 without additional wave-winding coils such as wave-winding coil 178, 180, 182, 184, 186, however, as discussed, stator apparatus 100 may include any number of wave-winding coils. In examples, in addition to wave-winding coil 104, stator core 102 mechanically supports one or more of wave-winding coil 178, 180, 182, 184, 186 such that each of wave-winding coil 178, 180, 182, 184, 186 define a primary overhang between first secondary overhang 116 and second primary overhang 120 defined by wave-winding coil 104. In examples, the one or more of wave-winding coil 178, 180, 182, 184, 186 define a plurality of interleaved primary overhangs between first secondary overhang 116 and second primary overhang 120. In the illustrated example, first secondary overhangs 116 are dashed for clarity.

First slot group 119 comprises first stator slot 113, second stator slot 115, third stator slot 117, and each additional slot around that inner periphery 103 of stator core 102 that is separated from the other members of first slot group 119 by the same number of intervening stator slots separating first stator slot 113 from second stator slot 115 and/or second stator slot 115 from third stator slot 117. For example, at least five intervening stator slots may separate each stator slot that is a member of first slot group 119 from every other stator slot that is a member of first slot group 119 when stator apparatus 100 is configured for a six-phase electrical machine. FIG. 7 depicts stator apparatus 100 configured for a six-phase rotating machine, with wave-winding coil 104 mechanically supported such that a stator slot 241, a stator slot 242, a stator slot 243, a stator slot 244, and a stator slot 245 are intervening slots between first stator slot 113 and second stator slot 115, and such that a stator slot 246, a stator slot 247, a stator slot 248, a stator slot 249, and a stator slot 250 are intervening slots between second stator slot 115 and third stator slot 117. Wave-winding coil 104 comprises a continuous flexible conductor extending from first end 150 to second end 152. A first electrical connector may be connected to first end 150. A second electrical connector may be connected to second end 152. Wave-winding coil 104 may comprise a flexible conductor with an insulative covering. The insulative covering may be configured to electrically isolate wave-winding coil 104 from its surroundings between the first electrical connector and the second electrical connector.

Wave-winding coil 104 may wind through each stator slot in the first slot group 119 twice such that two layers of wave-winding coil 104 pass through each member slot of slot group 119, going in opposite directions and alternating which layer is first as discussed above, creating a double-layer and defining an individual phase of the N-phase stator winding. The double layer arrangement as described in FIG. 5B is illustrated by showing only back overhangs 189 extending over back side 107 of stator core 102. Only wave-winding coil 104 is illustrated for clarity, but the plurality of wave-winding coils 124 may be wound through each of their corresponding slot groups in the same way, creating an interleaved winding layer as illustrated by reference number 192 in FIG. 2. For clarity and consistency with FIG. 5B, back overhangs defined by first conductor portion 112 are illustrated in solid lines and back overhangs defined by second conductor portion 118 are illustrated in dashed lines.

As discussed, wave-winding coil 104 may be mechanically supported by stator core 102 such that wave-winding coil 104 at least partially defines a plurality of winding layers 192 (e.g., winding layer 193, winding layer 195, and/or winding layer 197 (FIG. 2)). Wave-winding coil 104 may define additional conductor portions configured similarly to first conductor portion 112 and second conductor portion 118 in each winding layer. For example, wave-winding coil 104 may define a third conductor portion and a fourth conductor portion within winding layer 195 (FIG. 2), and may define a fifth conductor portion and a sixth conductor portion within winding layer 197 (FIG. 2). The additional conductor portions (e.g., the third conductor portion, fourth conductor portion, fifth conductor portion, and/or sixth conductor portion) may be portions of the flexible, continuous conductor defining first conductor portion 112 and second conductor portion 118. The additional conductor portions may be defined between first end 150 and second end 152 of wave-winding coil 104.

Wave-winding coil 104 may define the third conductor portion and the fourth conductor portion between first end 150 and second end 152. In other words, the third conductor portion and the fourth conductor portion are portions of the same continuous conductor that first conductor portion 112 and second conductor portion 118 are portions of. Wave-winding coil 104 may be wound through first stator slot 113, second stator slot 115, and third stator slot 117 such that first stator slot 113, second stator slot 115, and third stator slot 117 mechanically support the third conductor portion and fourth conductor portion. The third conductor portion may be wound in substantially the same manner as first conductor portion 112 as discussed above, such that the third conductor portion defines a primary overhang extending from the first stator slot 113 to second stator slot 115 over the front side 105 of stator core 102 and defines a secondary overhang extending from second stator slot 115 to third stator slot 117 over back side 107. The fourth conductor portion may be wound in substantially the same manner as second conductor portion 118 as discussed above, such that the fourth conductor defines a primary overhang extending from the first stator slot 113 to second stator slot 115 over the back side 107 of stator core 102 and defines a secondary overhang extending from second stator slot 115 to third stator slot 117 over front side 105.

The fourth conductor portion may be overlaid on the third conductor portion in first stator slot 113 and third stator slot 117, and the third conductor portion may be overlaid on the fourth conductor portion in second stator slot 115. The third conductor portion and the fourth conductor portion may be wound to create a double-layer winding layer. The double-layer made up of first conductor portion 112 and second conductor portion 118 may be first winding layer 193. The double-layered third conductor portion and the fourth conductor portion may define some portion of second winding layer 195. The first winding layer and the second winding layer may each be defined from a single length of wave-winding coil 104. The plurality of wave-winding coils 124 may be wound through corresponding slot groups in like manner, forming a first winding layer and a second winding layer from a single length of a flexible conductor.

Wave-winding coil 104 may define the fifth conductor portion and the sixth conductor portion between first end 150 and second end 152. The fifth conductor portion and the sixth conductor portion may be wound through first stator slot 113, second stator slot 115, and third stator slot 117 such that first stator slot 113, second stator slot 115, and third stator slot 117 mechanically support the fifth and sixth conductor portions. The fifth conductor portion may be wound in substantially the same manner as first conductor portion 112 discussed above, such that a primary overhang extends from the first stator slot 113 to second stator slot 115 over the front side of the stator core and a secondary overhang extends from second stator slot 115 to third stator slot 117 over the back side. The sixth conductor portion may be wound in substantially the same manner as second conductor portion 118 discussed above, such that a primary overhang extends from the first stator slot 113 to second stator slot 115 over the back side of the stator core and a secondary overhang extends from second stator slot 115 to third stator slot 117 over the front side. The sixth conductor portion may be overlaid on the fifth conductor portion in first stator slot 113 and third stator slot 117, and the fifth conductor portion may be overlaid on the sixth conductor portion in second stator slot 115. The fifth conductor portion and sixth conductor portion may be wound to create a double-layer. The double-layered fifth conductor portion and the sixth conductor portion may define some portion of a winding layer. The double-layer made up of the fifth conductor portion and the sixth conductor portion may be third winding layer 197. The first winding layer, second winding layer, and third winding layer may each be defined from a single length of wave-winding coil 104 between first end 150 and second end 152. The plurality of wave-winding coils 124 may be wound through corresponding slot groups in like manner, forming a first winding layer, a second winding layer, and a third winding layer from a single length of a flexible conductor.

As illustrated in FIG. 2 and discussed above, first wave-winding layer 193, second wave-winding layer 195, and third wave-winding layer are wound in the same direction (either CW or CCW) about the periphery 103. In some examples, wave-winding layers 193, 195, and 197 may be wound in alternate directions. For example, if first winding layer 193 is wound in a CW-direction about the periphery 103, second winding layer 195 may be wound in a CCW-direction and third winding layer 197 may be wound in a CW-direction, creating a wave-winding arrangement with alternating winding layers.

FIG. 8, FIG. 9, FIG. 10, FIG. 11, FIG. 12, FIG. 13, and FIG. 14 illustrate wave-winding configurations and an example wave-winding technique for a stator apparatus 100 configured for an N-phase rotating machine. In these figures, the stator core 102 is illustrated as a dashed line for clarity. FIGS. 8-14 illustrate example configurations and techniques for a six-phase rotating machine with a conventional distributed winding arrangement, however the configurations and techniques described may be applied to stator assemblies configured for any number of phases, and may be applied to other winding arrangements, such as fractional winding arrangements (e.g., the fractional winding arrangement of FIG. 6). The technique described represents one technique for winding stator apparatus 100, although other techniques may be employed. The winding technique disclosed herein may be substantially performed manually by an operator in some examples. In other examples, the winding technique disclosed may be performed with the use of machinery as a substantially automated or semi-automated process.

Figure 8:
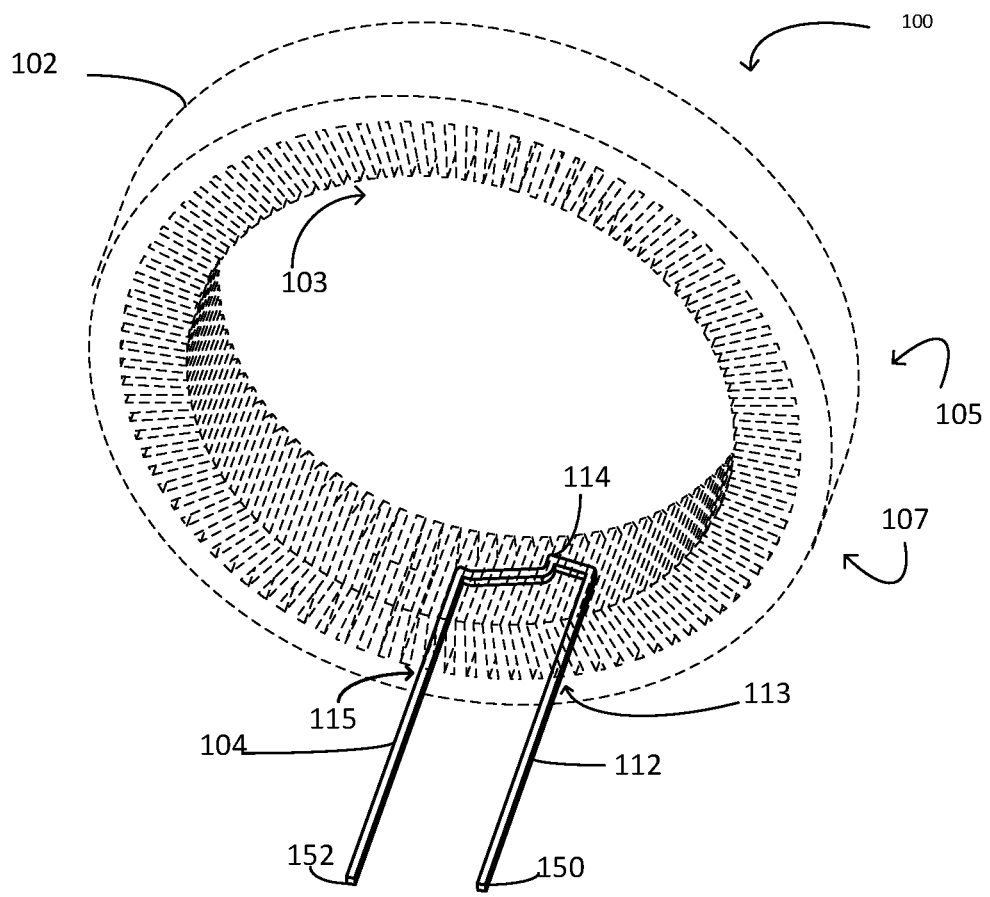
FIG. 8 is a perspective view illustrating an example wave-winding coil wound through a first stator slot cluster and a second stator slot cluster of a first slot group defining an electrical phase of a stator winding.

FIG. 8 is a perspective view illustrating an example configuration of wave-winding coil 104 which may be utilized in a wave-winding technique for stator apparatus 100. Wave-winding coil 104 extends from first end 150 to second end 152. The technique includes mechanically supporting wave-winding coil 104 in first slot group 119 (FIGS. 3A, 3B, 4A, 4B). In examples, stator core 102 mechanically supports first conductor portion 112 of wave-winding coil 104 in first stator slot 113. Stator core 102 may further mechanically support first conductor portion 112 of wave-winding coil 104 in second stator slot 115. Wave-winding coil 104 may define first primary overhang 114 extending between first stator slot 113 and second stator slot 115 when first stator slot 113 and second stator slot 115 mechanically support wave-winding coil 104. First primary overhang 114 may extend over front side 105. In examples, when stator apparatus 100 is configured for an N-phase winding (e.g., a six-phase winding), first conductor portion 112 may be wound from back side 107 to front side 105 through first stator slot 113, then from front side 105 to back side 107 through second stator slot 115, such that there are (N−1) intervening stator slots (e.g., 5 intervening stator slots) between first stator slot 113 and second stator slot 115.

Figure 9:
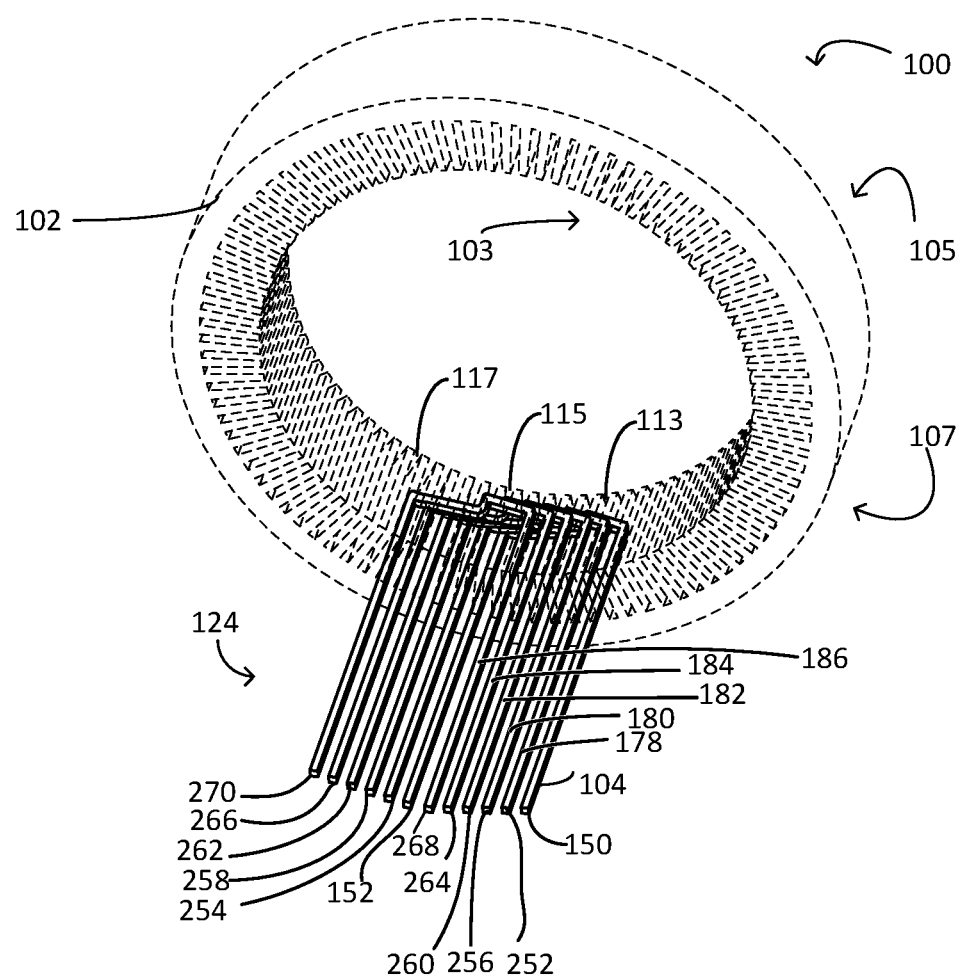
FIG. 9 is a perspective view illustrating a plurality of individual wave-winding coils wound through first stator slot clusters and second stator slot clusters of individual slot groups defining individual electrical phases of a stator winding.

FIG. 9 is a perspective view illustrating an example wave-winding configuration and/or technique for a plurality of wave-winding coils 124, including wave-winding coil 178, wave-winding coil 180, wave-winding coil 182, wave-winding coil 184, and wave-winding coil 186. Wave-winding coil 178, 180, 182, 184, 186 may be configured similarly to wave-winding coil 104. In examples, wave-winding coil 178 includes a flexible conductor extending from a first end 252 to a second end 254. Wave-winding coil 180 may include a flexible conductor extending from a first end 256 to a second end 258. Wave-winding coil 182 may include a flexible conductor extending from a first end 260 to a second end 262. Wave-winding coil 184 may include a flexible conductor extending from a first end 264 to a second end 266. Wave-winding coil 186 may include a flexible conductor extending from a first end 268 to a second end 270.

The technique may include mechanically supporting each of wave-winding coils 178, 180, 182, 184, 186 in an individual slot group defined by stator core 102. The individual slot group may mechanically support one of wave-winding coils 178, 180, 182, 184, 186. For example, the technique may include mechanically supporting wave-winding coil 178 in a second slot group, mechanically supporting wave-winding coil 180 in a third slot group, mechanically supporting wave-winding coil 182 in a fourth slot group, mechanically supporting wave-winding coil 184 in a fifth slot group, and/or mechanically supporting wave-winding coil 186 in a sixth slot group.

Winding coil 178, 180, 182, 184, 186 may be mechanically supported in the individual slot group in substantially the same manner first slot group 119 mechanically supports wave-winding 104. Stator core 102 may mechanically support a first conductor portion of wave-winding coil 178, 180, 182, 184, 186 in a first stator slot of the individual slot group. Stator core 102 may mechanically support a second conductor portion of wave-winding coil 178, 180, 182, 184, 186 in a second stator slot of the individual slot group. Wave-winding coil 178, 180, 182, 184, 186 may define a first primary overhang extending between the first stator slot of the individual slot group and the second stator slot of the individual slot group when the first stator slot of the individual slot group and second stator slot of the individual slot group mechanically support wave-winding coil wave-winding coil 178, 180, 182, 184, 186.

In examples, as illustrated in FIG. 9, stator core 102 mechanically supports the plurality of wave-winding coils 124 in a circumferential order around periphery 103 of stator core 102 (e.g., in the order 104-178-180-182-184-186). Stator core 102 may mechanically support wave-winding coil 178, 180, 182, 184, 186 in the individual slot group such that the primary overhangs defined by the plurality of wave-winding coils 124 interleave based on the circumferential order.

Each of wave-winding coil 178, 180, 182, 184, 186 may wind through adjacent corresponding first stator slots in the intervening stator slots between first stator slot 113 and second stator slot 115. For example, wave-winding coil 178 may occupy a stator slot adjacent to first stator slot 113. Wave-winding coil 180 may, occupy a stator slot adjacent to the stator slot occupied by wave-winding coil 178. Wave-winding coil 182 may occupy a stator slot adjacent to the stator slot occupied by wave-winding coil 180. Wave-winding coil 184 may occupy a stator slot adjacent to the stator slot occupied by wave-winding coil 182. Wave-winding coil 186 may occupy a stator slot adjacent to the stator slot occupied by wave-winding coil 184. When stator apparatus 100 is configured for a six-phase rotating machine, five additional wave-winding coils in addition to winding coil 104 may wind through five intervening stator slots, for a total of six wave-winding coils, for a six-phase machine winding. In a rotating machine with N-phases, there may be a total of N wave-winding coils.

Figure 10:
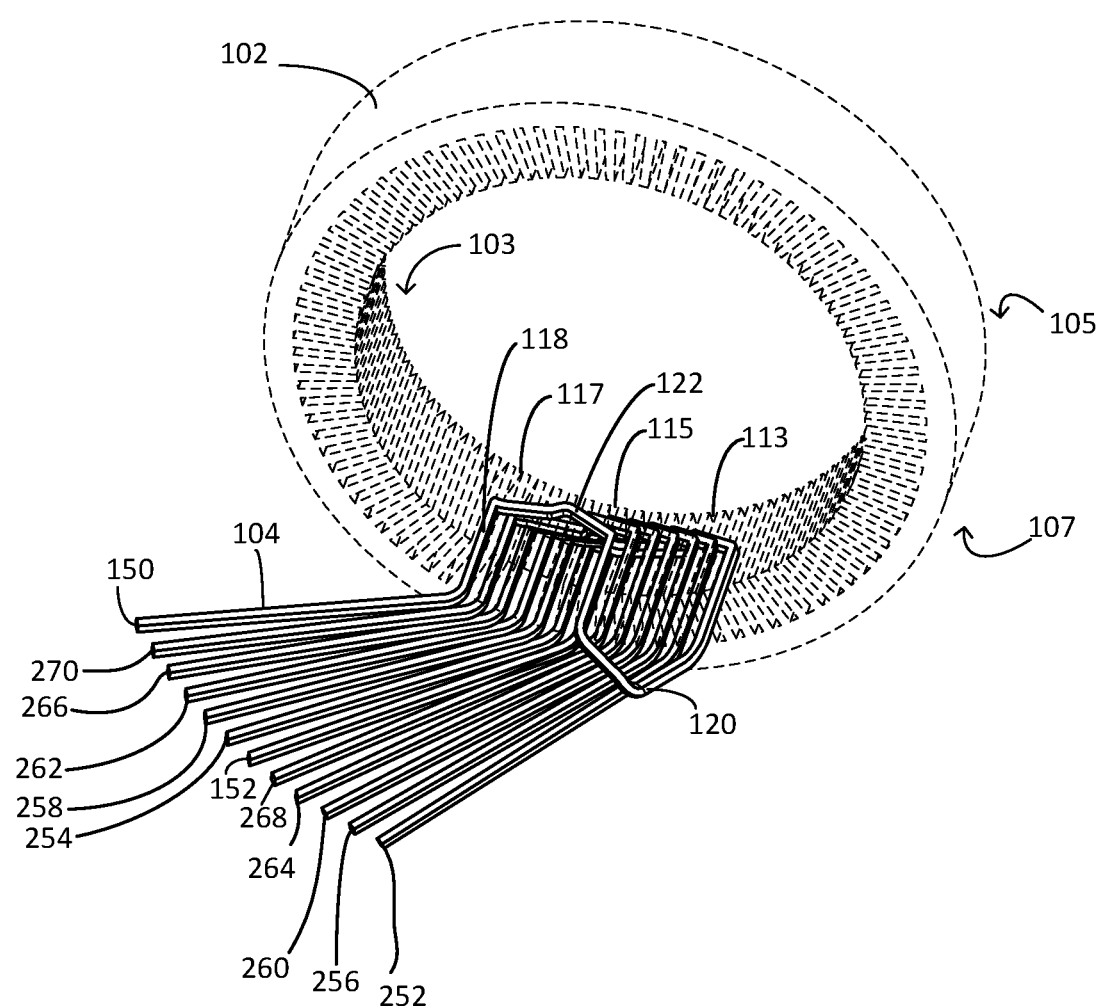
FIG. 10 is a perspective view illustrating a first wave-winding coil in the plurality of individual wave-winding coils of FIG. 8 wound through a third stator slot cluster of a slot group defining an electrical phase of a stator winding.

FIG. 10 is a perspective illustrating an example configuration of the plurality of wave-winding coils 124 with second stator slot 115 and third stator slot 117 of first slot group 119 mechanically supporting second conductor portion 118 of wave-winding coil 104. In examples, the wave-winding technique may be conducted such that the configuration of FIG. 10 sequentially follows the configuration of FIG. 9. Wave-winding coil 104 may define second primary overhang 120 extending between first stator slot 113 and second stator slot 115 and a second secondary overhang 122 extending between second stator slot 115 and third stator slot 117 when second stator slot 115 and third stator slot 117 mechanically support wave-winding coil 104. Second primary overhang 120 may extend over back side 107. Second secondary overhang 122 may extend over front side 105. In examples, when stator apparatus 100 is configured for an N-phase winding (e.g., a six-phase winding), second conductor portion 118 may be wound from front side 105 to back side 107 through first stator slot 113, back side 107 to front side 105 through stator slot 115 to define second primary overhang 120. Second conductor portion 118 may be wound from front side 105 to back side 107 through third stator slot 117 to define second secondary overhang 122.

Figure 11:
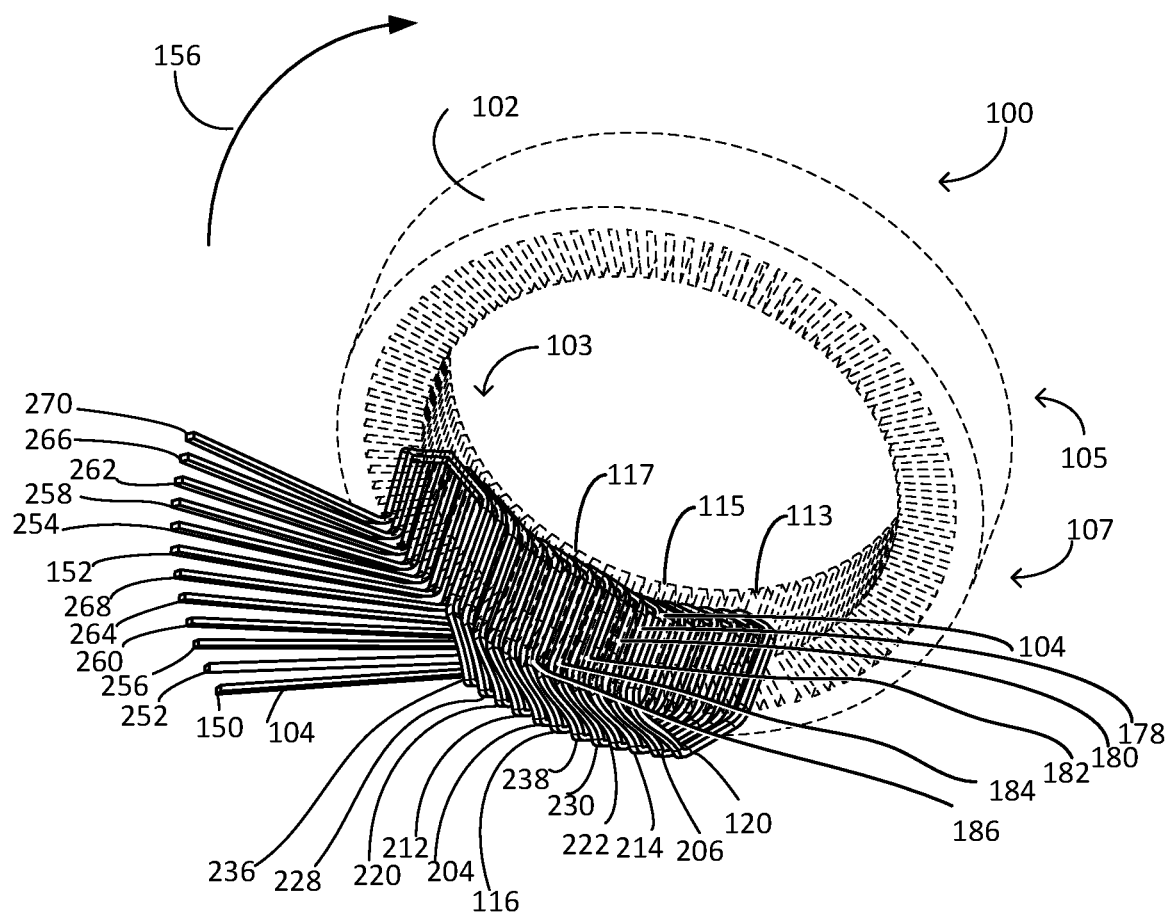
FIG. 11 is a perspective view illustrating the plurality of individual wave winding coils of FIG. 9 and FIG. 10 wound through third stator slot clusters of the individual slot groups of the stator core.

FIG. 11 is a perspective illustrating an example wave-winding configuration of the plurality of wave-winding coils 124, including wave-winding coil 178, wave-winding coil 180, wave-winding coil 182, wave-winding coil 184, and wave-winding coil 186. Wave-winding coils 178, 180, 182, 184, 186 may be configured similarly to wave-winding coil 104.

Each of wave-winding coil 178, 180, 182, 184, 186 may wind through adjacent corresponding first stator slots in the intervening stator slots between first stator slot 113 and second stator slot 115, corresponding second stator slots between second stator slot 115 and third stator slot 117, and corresponding third stator slots adjacent to third stator slot 117 in the circumferential direction defined by arrow 156. For example, wave-winding coil 178 may occupy a stator slot adjacent to first stator slot 113, a second stator slot adjacent to second stator slot 115, and a third stator slot adjacent to stator slot 117. Wave-winding coil 180 may occupy a first, second, and third stator slots adjacent to the stator slots occupied by wave-winding coil 178. Wave-winding coil 182 may occupy a first, second, and third stator slot adjacent to the stator slots occupied by wave-winding coil 180. Wave-winding coil 184 may occupy first, second, and third stator slots adjacent to the stator slots occupied by wave-winding coil 182. Wave-winding coil 186 may occupy first, second, and third stator slots adjacent to the stator slots occupied by wave-winding coil 184. When stator apparatus 100 is configured for a six-phase rotating machine, five additional wave-winding coils in addition to winding coil 104 may wind through five intervening stator slots, for a total of six wave-winding coils, for a six-phase machine winding. In a rotating machine with N-phases, there may be a total of N wave-winding coils.

Wave-winding coils 178, 180, 182, 184, and 186 may define second primary overhangs 206, 214, 222, 230, and 238 extending over back side 107 respectively between each of their corresponding first and second stator slots. Wave-winding coils 178, 180, 182, 184, and 186 may define second secondary overhangs (not shown) extending over front side 105 between each of their corresponding second stator slots and corresponding third stator slots. Stator core 102 may mechanically support second primary overhangs 120, 206, 214, 222, 230, and 238 such that the second primary overhangs interleave in circumferential order.

Figure 13:
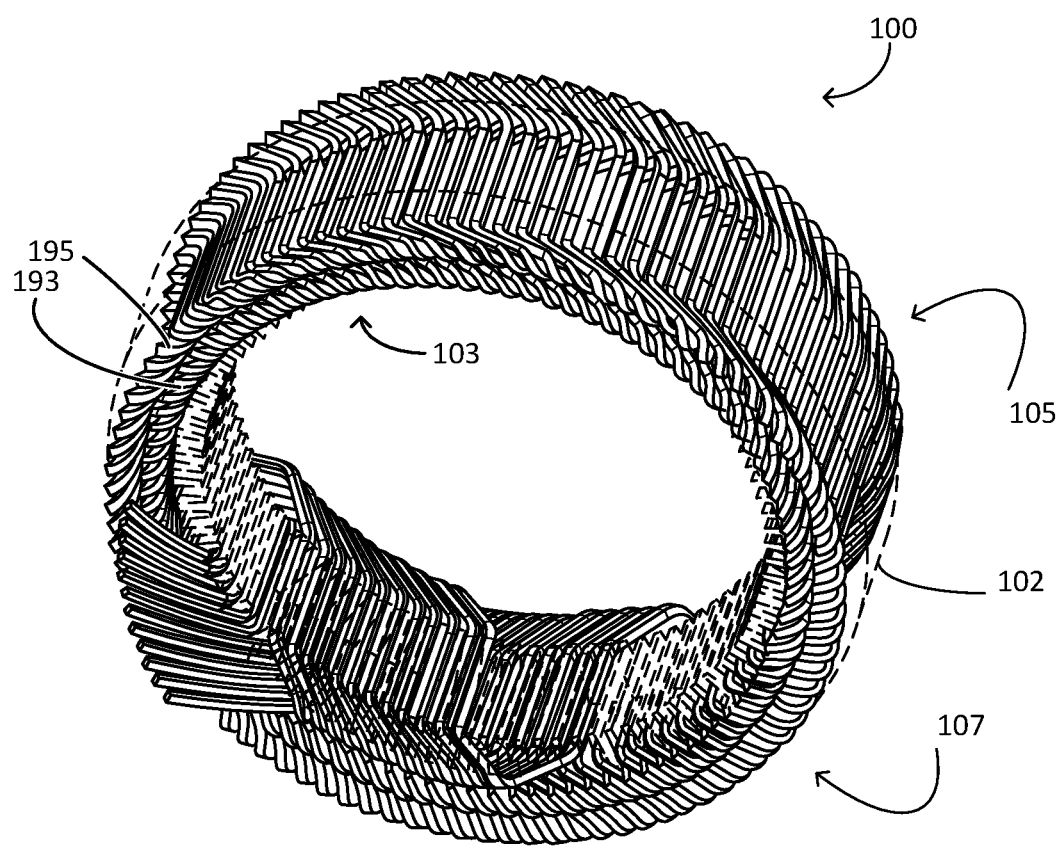
FIG. 13 is a perspective view illustrating the plurality of individual wave winding coils of FIGS. 9-12 wound around the periphery of the stator core to define a second winding layer.
Figure 14:
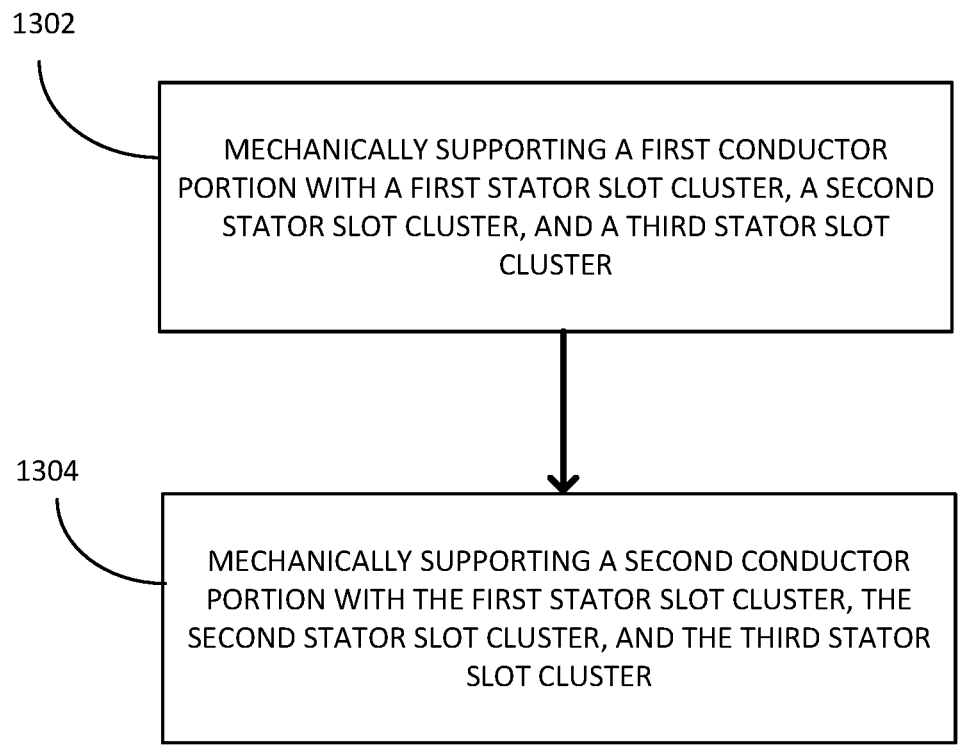
FIG. 14 is a flow diagram illustrating an example technique for winding a stator apparatus.

Hence, as illustrated in FIG. 14, the technique includes mechanically supporting a first conductor portion of wave-winding coil 178, 180, 182, 184, and 186 in first stator slot 113, second stator slot 115, and third stator slot 117 (1302). First stator slot 113 represents the first stator slot cluster, because the example depicted in FIGS. 8-13, as discussed above, is a conventional distributed winding arrangement. Similarly, second stator slot 115 represents the second stator slot cluster and third stator slot 117 represents the third stator slot cluster in the illustrated example. In some examples, where the winding arrangement is fractional winding, the first stator slot cluster may include at least one individual stator slot in addition to first stator slot 113, the second stator slot cluster may include at least one individual stator slot in addition to second stator slot 115, and the third stator slot cluster may include at least one individual stator slot in addition to third stator slot 117. The technique includes mechanically supporting a second portion of wave-winding coil 178, 180, 182, 184, and 186 in first stator slot 113 (first stator slot cluster), second stator slot 115 (second stator slot cluster), and third stator slot 117 (third stator slot cluster) (1304).

Figure 12:
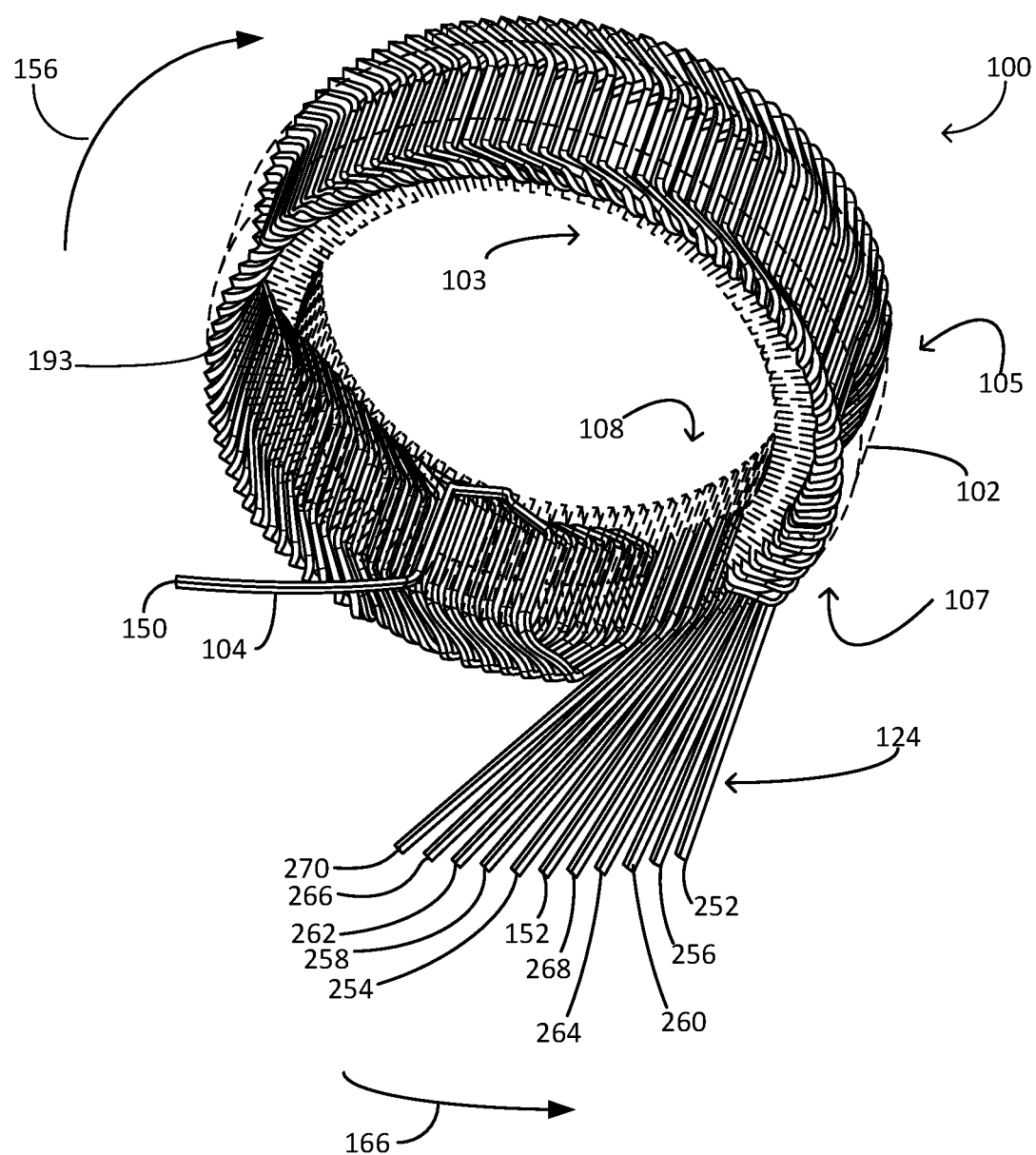
FIG. 12 is a perspective view illustrating the plurality of individual wave winding coils of FIGS. 9-11 wound around a periphery of the stator core to define a first winding layer.

FIG. 12 illustrates the plurality of wave-winding coils 124 in FIGS. 9-11 (e.g., wave-winding coils 104, 178, 180, 182, 184, 186 (FIG. 10)) wound substantially all the way around periphery 103 of stator core 102 to define first winding layer 193. Each of the plurality of wave-winding coils 124 may be wound through substantially all of the stator slots in their corresponding individual slot group to define first winding layer 193. The plurality of wave-winding coils 124 may define one or more additional winding layers (e.g., winding layer 195, 197 (FIG. 2)). Stator core 102 may mechanically support the plurality of wave-winding coils 124 when the plurality of wave-winding coils 124 define the one or more additional layers. In examples, to define each additional winding layer, each of wave-winding coil end 150, 270, 266, 262, 258, 254, 152, 268, 264, 260, 256, 252 in subsequent order beginning with end 150 and proceeding along the direction of the arrow 166, may each wind from back side 107 to front side 105, then from front side 105 to back side 107, skipping five intervening stator slots in a circumferential direction shown by arrow 156 for each winding of each end. In each additional layer, each of wave-winding coils 104, 178, 180, 182, 184, 186 is wound to define front overhangs and back overhangs and be mechanically supported by an individual slot group such when a first end 150 of a wave-winding coil has a different voltage potential than a second end of the wave-winding coil, an electrical current flows through each portion of the wave-winding coil in a given stator slot either in a direction from back side 107 to front side 105 or in a direction from front side 105 to back side 107. The additional layer is thus configured to produce the same direction of current flow in the given stator slot in each winding layer (e.g., each of winding layer 193, 195, 197 (FIG. 2)).

In some examples, second winding layer 195 may be overlaid on first winding layer in the opposite direction of first winding layer 193. After mechanically supporting each of the plurality of wave-winding coils through substantially all of the stator slots in their corresponding slot group to define first winding layer 193, an additional winding layer may be created which is wound in the opposite direction of first winding layer 193. To create an additional layer wound in the opposite direction, each of wave-winding coil end 150, 270, 266, 262, 258, 254, 152, 268, 264, 260, 256, 252 in subsequent order beginning with end 150 and proceeding along the direction of the arrow 166, may each wind from back side 107 to front side 105, then from front side 105 to back side 107, skipping five intervening stator slots in a circumferential direction opposite the direction shown by arrow 156 for each winding of each end.

FIG. 13 illustrates the plurality of wave-winding coils 124 in FIGS. 9-12 (e.g., wave-winding coils 104, 178, 180, 182, 184, 186 (FIG. 11)) wound substantially all the way around inner periphery 103 of stator core 102 and define second winding layer 195. Each of the plurality of wave-winding coils 124 may be wound through substantially all of the stator slots in their corresponding individual slot group to define second winding layer 195. The plurality of wave-winding coils 124 may define one or more additional winding layers (e.g., winding layer 197 (FIG. 2) by winding each of wave-winding coils 104, 178, 180, 182, 184, 186 around periphery 103 in substantially the same manner as that described for winding layer 193, 195.

The present disclosure includes the following examples.

Example 1: A stator apparatus comprising: a stator core defining an axis and including a front side and a back side axially displaced from the front side, wherein the stator core defines at least a first stator slot cluster, a second stator slot cluster, and a third stator slot cluster around a periphery of the stator core surrounding the axis, wherein the first stator slot cluster, the second stator slot cluster, and the third stator slot cluster each comprise one or more adjacent individual stator slots which extend from the front side to the back side, and wherein the second stator slot cluster is between the first stator slot cluster and the third stator slot cluster along the periphery; and a wave-winding coil comprising a flexible conductor extending from a first end to a second end and defining a first conductor portion and a second conductor portion between the first end and the second end, wherein the first conductor portion is mechanically supported by the first stator slot cluster, the second stator slot cluster, and the third stator slot cluster to define a first primary overhang extending from the first stator slot cluster to the second stator slot cluster and a first secondary overhang extending from the second stator slot cluster to the third stator slot cluster, wherein the first primary overhang extends over the front side and the secondary overhang extends over the back side, and wherein the second conductor portion is mechanically supported by the first stator slot cluster, the second stator slot cluster, and the third stator slot cluster to define a second primary overhang extending from the first stator slot cluster to the second stator slot cluster and a second secondary overhang extending from the second stator slot cluster to the third stator slot cluster, wherein the second primary overhang extends over the back side and the second secondary overhang extends over the front side.

Example 2: The stator apparatus of example 1, wherein the wave-winding coil includes a first electrical connector at the first end, a second electrical connector at the second end, and an insulative covering extending substantially from the first electrical connector to the second electrical connector, wherein the insulative covering is configured to electrically isolate the wave-winding coil between the first electrical connector and the second electrical connector.

Example 3: The stator apparatus of example 1 or example 2, wherein the flexible conductor is a continuous conductor extending from the first end to the second end, and wherein the flexible conductor is configured to bend to define the first primary overhang, the second primary overhang, the second primary overhang, and the second secondary overhang.

Example 4: The stator apparatus of any of examples 1-3, wherein the second conductor portion is overlaid on the first conductor portion in the first stator slot cluster and the third stator slot cluster, and wherein the first conductor portion is overlaid on the second conductor portion in the second stator slot cluster when the first conductor portion and the second conductor portion are positioned in the first stator slot cluster, the second stator slot cluster, and the third stator slot cluster.

Example 5: The stator apparatus of any of examples 1-4, wherein at least one of the first stator slot cluster, the second stator slot cluster, or the third stator slot cluster consists of an individual stator slot.

Example 6: The stator apparatus of any of examples 1-5, wherein the flexible conductor comprises a Litz-wire.

Example 7: The stator apparatus of any of examples 1-6, wherein: the stator apparatus includes a plurality of wave-winding coils comprising an N-phase stator winding, the stator core defines a corresponding slot group for each individual wave-winding coil, and each individual wave-winding coil is mechanically supported by its corresponding slot group to define an individual phase of the N-phase stator winding.

Example 8: The stator apparatus of example 7, wherein the stator core mechanically supports the plurality of wave-winding coils in a circumferential order around the periphery, wherein the plurality of wave-winding coils define a plurality of front overhangs and a plurality of back overhangs, and wherein the plurality of front overhangs are interleaved in the circumferential order and the plurality of back overhangs are interleaved in the circumferential order.

Example 9: The stator apparatus of any of examples 1-8, wherein the first slot cluster, the second slot cluster, and the third slot cluster comprise stator slots within a slot group, and wherein the stator core defines a plurality of additional slots further comprising the slot group, and wherein the flexible conductor is mechanically supported by substantially all stator slots in the slot group.

Example 10: The stator apparatus of examples 1-9, wherein the flexible conductor further defines a third conductor portion and a fourth conductor portion between the first end and the second end, wherein the third conductor portion and the fourth conductor portion are mechanically supported by the first stator slot cluster, the second stator slot cluster, and the third stator slot cluster.

Example 11: The stator apparatus of example 10, wherein the first conductor portion and the second conductor portion comprise a first winding layer, wherein the third conductor portion and the fourth conductor portion comprise a second winding layer, and wherein the first winding layer is between the second winding layer and the axis.

Example 12: The stator apparatus of example 11 or example 12, wherein the third conductor portion defines an additional first primary overhang extending from the first stator slot cluster to the second stator slot cluster and an additional first secondary overhang extending from the second stator slot cluster to the third stator slot cluster, wherein the additional first primary overhang extends over the front side and the additional first secondary overhang extends over the back side, and wherein the fourth conductor portion defines an additional second primary overhang extending from the first stator slot cluster to the second stator slot cluster and an additional second secondary overhang extending from the second stator slot cluster to the third stator slot cluster, wherein the additional second primary overhang extends over the back side and the additional second secondary overhang extends over the front side.

Example 13: An electrical rotating machine comprising: a stator core defining an axis and including a front side and a back side axially displaced from the front side, wherein the stator core defines at least a first stator slot cluster, a second stator slot cluster, and a third stator slot cluster around a periphery of the stator core surrounding the axis, wherein the first stator slot cluster, the second stator slot cluster, and the third stator slot cluster comprise one or more adjacent individual stator slots which extend from the front side to the back side, and wherein the second stator slot cluster is between the first stator slot cluster and the third stator slot cluster along the periphery; and a wave-winding coil comprising a flexible conductor extending from a first end to a second end and defining a first conductor portion and a second conductor portion between the first end and the second end, wherein the first conductor portion is mechanically supported by the first stator slot cluster, the second stator slot cluster, and the third stator slot cluster to define a first primary overhang extending from the first stator slot cluster to the second stator slot cluster and a first secondary overhang extending from the second stator slot cluster to the third stator slot cluster, wherein the first primary overhang extends over the front side and the secondary overhang extends over the back side, wherein the second conductor portion is mechanically supported by the first stator slot cluster, the second stator slot cluster, and the third stator cluster slot to define a second primary overhang extending from the first stator slot cluster to the second stator slot cluster and a second secondary overhang extending from the second stator slot cluster to the third stator slot cluster, wherein the second primary overhang extends over the back side and the second secondary overhang extends over the front side, wherein the second conductor portion is overlaid on the first conductor portion in the first stator slot cluster and the third stator slot cluster, and wherein the first conductor portion is overlaid on the second conductor portion in the second stator slot cluster when the first conductor portion and the second conductor portion are positioned in the first stator slot cluster, the second stator slot cluster, and the third stator slot cluster, and wherein the wave-winding coil includes a first electrical connector at the first end, a second electrical connector at the second end, and an insulative covering extending substantially from the first electrical connector to the second electrical connector, wherein the insulative covering is configured to electrically isolate the wave-winding coil between the first electrical connector and the second electrical connector.

Example 14: A method, comprising: mechanically supporting a first conductor portion of a wave-winding coil with a first stator slot cluster, a second stator slot cluster, and a third stator slot cluster defined by a stator core around a periphery of the stator core, wherein the first conductor portion defines a first primary overhang extending over a front side of the stator core from the first stator slot cluster to the second stator slot cluster and a first secondary overhang extending over a back side of the stator core from the second stator slot cluster to the third stator slot cluster, wherein the front side is axially displaced from the back side, wherein the first stator slot cluster, the second stator slot cluster, and the third stator slot cluster comprise one or more adjacent individual stator slots which extend from the front side to the back side, and wherein the second stator slot cluster is between the first stator slot cluster and the third stator slot cluster along the inner stator periphery; and mechanically supporting a second conductor portion defined by the wave-winding coil through the first stator slot cluster, the second stator slot cluster, and the third stator slot cluster, wherein the second conductor portion defines a second primary overhang extending over the back side from the first stator slot cluster to the second stator slot cluster and a second secondary overhang extending over the front side from the second stator slot cluster to the third stator slot cluster, wherein the wave-winding coil comprises a flexible conductor extending from a first end to a second end and defining the first conductor portion and the second conductor portion between the first end and the second end.

Example 15: The method of example 14, further comprising: connecting a first electrical connector at the first end of the flexible conductor and connecting a second electrical connector at the second end of the flexible conductor; and insulating the flexible conductor using an insulative layer surrounding the flexible conductor substantially from the first electrical connector to the second electrical connector.

Example 16: The method of example 14 or example 15, the method further comprising: overlaying the second conductor portion on the first conductor portion in the first stator slot cluster and the third stator slot cluster; and overlaying the first conductor portion on the second conductor portion in the second stator slot cluster.

Example 17: The method of any of examples 14-16, further comprising: separating the first stator slot cluster from the second stator slot cluster by a quantity of intervening slots; and separating the second stator slot cluster from the third stator slot cluster by the quantity of intervening slots.

Example 18: The method of any of examples 14-17, further comprising mechanically supporting a plurality of flexible conductors using the first stator slot cluster, the second stator slot cluster, and the third stator slot cluster when the first stator slot cluster, the second stator slot cluster, and the third stator slot cluster mechanically support the flexible conductor, wherein the plurality of flexible conductors extend from the first end to the second end, wherein the plurality of flexible conductors define the first primary overhang, the first secondary overhang, the second primary overhang, and the second secondary overhang.

Example 19: The method of any of examples 14-18, wherein the wave-winding coil is a first wave-winding coil and first stator slot cluster, the second stator slot cluster, and the third stator slot cluster comprise a first slot group, and further comprising: mechanically supporting a first conductor portion of a second wave-winding coil with a first stator slot cluster of a second slot group, a second stator slot cluster of the second slot group, and a third stator slot cluster of the second slot group defined by the stator core around the periphery of the stator core, wherein the first conductor portion of the second wave-winding coil defines an additional first primary overhang extending over the front side from the first stator slot cluster of the second slot group to the second stator slot cluster of the second slot group and an additional first secondary overhang extending over the back side from the second stator slot cluster of the second slot group to the third stator slot cluster of the second slot group, wherein the first stator slot cluster of the second slot group, the second stator slot cluster of the second slot group, and the third stator slot cluster of the second slot group extend from the front side to the back side, and wherein the second stator slot cluster of the second slot group is between the first stator slot cluster of the second slot group and the third stator slot cluster of the second slot group; and mechanically supporting a second conductor portion of the additional wave winding coil through the first stator slot cluster of the second slot group, the second stator slot cluster of the second slot group, and the third stator slot cluster of the second slot group, wherein the second conductor portion of the second wave-winding coil defines an additional second primary overhang extending over the back side from the first stator slot cluster of the second slot group to the second stator slot cluster of the second slot group and an additional second secondary overhang extending over the front side from the second stator slot cluster of the second slot group to the third stator slot cluster of the second slot group, wherein the second wave-winding coil comprises a second flexible conductor extending from an additional first end to an additional second end and defining the first conductor portion of the second wave-winding coil and the second conductor portion of the second wave-winding coil between the first end and the second end.

Example 20: The method of example 19, the method further comprising: mechanically supporting the second wave-winding coil through substantially all stator slot clusters in the second slot group.

Various examples have been described. These and other examples are within the scope of the following claims.

What is claimed is:

1. A method, comprising:
insulating a flexible conductor using an insulative layer surrounding the flexible conductor substantially from a first end of the flexible conductor to a second end of the flexible conductor;
subsequent to insulating the flexible conductor from the first end to the second end, winding a first conductor portion of a wave-winding coil through a first stator slot cluster, a second stator slot cluster, and a third stator slot cluster defined by a stator core around a periphery of the stator core, wherein the first conductor portion defines a first primary overhang extending over a front side of the stator core from the first stator slot cluster to the second stator slot cluster and a first secondary overhang extending over a back side of the stator core from the second stator slot cluster to the third stator slot cluster, wherein the front side is axially displaced from the back side, wherein the first stator slot cluster, the second stator slot cluster, and the third stator slot cluster comprise one or more adjacent individual stator slots which extend from the front side to the back side, and wherein the second stator slot cluster is between the first stator slot cluster and the third stator slot cluster along the inner stator periphery; and
subsequent to winding the first conductor portion, winding a second conductor portion defined by the wave-winding coil through the first stator slot cluster, the second stator slot cluster, and the third stator slot cluster, wherein the second conductor portion defines a second primary overhang extending over the back side from the first stator slot cluster to the second stator slot cluster and a second secondary overhang extending over the front side from the second stator slot cluster to the third stator slot cluster, wherein the wave-winding coil comprises the flexible conductor extending from the first end to the second end and defining the first conductor portion and the second conductor portion between the first end and the second end, and wherein, as wound, the flexible conductor is a uniform, continuous unitary conductor extending from the first end to the second end, and wherein the first conduct portion and the second conductor portion are each individual portions of a single flexible conductor, and wherein the flexible conductor comprises a Litz-wire comprising a plurality of strands, wherein each strand of the plurality of strands is electrically insulated from the other strands.

2. The method of claim 1, further comprising:
connecting a first electrical connector at the first end of the flexible conductor and connecting a second electrical connector at the second end of the flexible conductor.

3. The method of claim 1, the method further comprising:
overlaying the second conductor portion on the first conductor portion in the first stator slot cluster and the third stator slot cluster; and
overlaying the first conductor portion on the second conductor portion in the second stator slot cluster.

4. The method of claim 1, further comprising:
separating the first stator slot cluster from the second stator slot cluster by a quantity of intervening slots; and
separating the second stator slot cluster from the third stator slot cluster by the quantity of intervening slots.

5. The method of claim 1, further comprising winding a plurality of flexible conductors through the first stator slot cluster, the second stator slot cluster, and the third stator slot cluster when the first stator slot cluster, the second stator slot cluster, and the third stator slot cluster mechanically support the flexible conductor, wherein the plurality of flexible conductors extend from the first end to the second end, wherein the plurality of flexible conductors define the first primary overhang, the first secondary overhang, the second primary overhang, and the second secondary overhang.

6. The method of claim 1, wherein the wave-winding coil is a first wave-winding coil and the first stator slot cluster, the second stator slot cluster, and the third stator slot cluster comprise a first slot group, and further comprising:
winding a first conductor portion of a second wave-winding coil through a first stator slot cluster of a second slot group, a second stator slot cluster of the second slot group, and a third stator slot cluster of the second slot group defined by the stator core around the periphery of the stator core,
wherein the first conductor portion of the second wave-winding coil defines an additional first primary overhang extending over the front side from the first stator slot cluster of the second slot group to the second stator slot cluster of the second slot group and an additional first secondary overhang extending over the back side from the second stator slot cluster of the second slot group to the third stator slot cluster of the second slot group, wherein the first stator slot cluster of the second slot group, the second stator slot cluster of the second slot group, and the third stator slot cluster of the second slot group extend from the front side to the back side, and wherein the second stator slot cluster of the second slot group is between the first stator slot cluster of the second slot group and the third stator slot cluster of the second slot group; and winding a second conductor portion of the second wave-winding coil through the first stator slot cluster of the second slot group, the second stator slot cluster of the second slot group, and the third stator slot cluster of the second slot group, wherein the second conductor portion of the second wave-winding coil defines an additional second primary overhang extending over the back side from the first stator slot cluster of the second slot group to the second stator slot cluster of the second slot group and an additional second secondary overhang extending over the front side from the second stator slot cluster of the second slot group to the third stator slot cluster of the second slot group, wherein the second wave-winding coil comprises a second flexible conductor extending from an additional first end to an additional second end and defining the first conductor portion of the second wave-winding coil and the second conductor portion of the second wave-winding coil between the first end and the second end.

7. The method of claim 6, the method further comprising:
mechanically supporting the second wave-winding coil through substantially all stator slot clusters in the second slot group.

8. The method of claim 6, wherein winding a first conductor portion of a second wave-winding coil through a first stator slot cluster of a second slot group occurs prior to winding a second conductor portion defined by the first wave-winding coil through the first stator slot cluster.

9. The method of claim 6, further comprising winding a plurality of wave-winding coils through the stator core, wherein winding the plurality of wave-winding coils through the stator core comprises a third wave-winding coil, a fourth wave-winding coil, a fifth wave-winding coil, and a sixth wave-winding coil through the stator core.

10. The method of claim 9, further comprising winding the first wave-winding coil, the second wave-winding coil, the third wave-winding coil, the fourth wave-winding coil, the fifth wave-winding coil, and the sixth wave-winding coil around a periphery of the stator core such that a plurality of primary overhangs interleave based on a circumferential order.

11. The method of claim 10, further comprising each of the wave-winding coils all the way around the periphery of the stator core to define a first winding layer.

12. The method of claim 11, further comprising winding a second winding layer by winding each of the plurality of wave-winding coils in subsequent order in a clockwise direction, wherein the second winding layer produces the same direction of current flow in any given stator slot in each winding layer.

13. The method of claim 1, wherein the stator core is formed integrally in a single piece.

14. The method of claim 1, wherein the stator core is completely formed prior to winding the first conductor portion.

* * * * *